United States Patent
Kono

(10) Patent No.: US 10,152,343 B2
(45) Date of Patent: Dec. 11, 2018

(54) METHOD AND APPARATUS FOR MANAGING IT INFRASTRUCTURE IN CLOUD ENVIRONMENTS BY MIGRATING PAIRS OF VIRTUAL MACHINES

(71) Applicant: HITACHI, LTD., Tokyo (JP)

(72) Inventor: Yasutaka Kono, Sunnyvale, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/117,148

(22) PCT Filed: Aug. 13, 2014

(86) PCT No.: PCT/US2014/050956
§ 371 (c)(1),
(2) Date: Aug. 5, 2016

(87) PCT Pub. No.: WO2016/024970
PCT Pub. Date: Feb. 18, 2016

(65) Prior Publication Data
US 2017/0168866 A1    Jun. 15, 2017

(51) Int. Cl.
*G06F 9/455* (2018.01)

(52) U.S. Cl.
CPC ...... *G06F 9/45558* (2013.01); *G06F 9/45533* (2013.01); *G06F 2009/4557* (2013.01); *G06F 2009/45579* (2013.01); *G06F 2009/45591* (2013.01); *G06F 2009/45595* (2013.01)

(58) Field of Classification Search
CPC ............. G06F 9/45558; G06F 9/45533; G06F 2009/45595; G06F 2009/4557; G06F 2009/45591; G06F 2009/45579
See application file for complete search history.

(56) References Cited

U.S. PATENT DOCUMENTS

| | | | |
|---|---|---|---|
| 2007/0171921 A1 | 7/2007 | Wookey et al. | |
| 2008/0163194 A1* | 7/2008 | Dias | G06F 8/60 717/174 |
| 2009/0240880 A1 | 9/2009 | Kawaguchi | |
| 2011/0022711 A1 | 1/2011 | Cohn | |
| 2011/0214122 A1* | 9/2011 | Lublin | G06F 9/5033 718/1 |

(Continued)

OTHER PUBLICATIONS

International Search Report and Written Opinion for PCT App No. PCT/US2014/050956 dated Nov. 19, 2014, 13 pgs.

*Primary Examiner* — Meng Al T An
*Assistant Examiner* — Michael W Ayers
(74) *Attorney, Agent, or Firm* — Procopio, Cory, Hargreaves & Savitch LLP

(57) ABSTRACT

In example implementations, when a management program deploys new virtual machines, the management program may identify candidate virtual machines for replacement, score the possibilities of replacement and relate the new virtual machines to candidate virtual machines if it determines the probability of replacement is high. The management program may also migrate virtual machines and storage volumes used by the virtual machines to other physical servers and storage arrays by related pairs of virtual machines. The management program may also inherit management policies from existing virtual machines being replaced and leverage them to manage new virtual machines, which replace the existing virtual machines.

8 Claims, 30 Drawing Sheets

(56) References Cited

U.S. PATENT DOCUMENTS

| | | | |
|---|---|---|---|
| 2011/0225277 A1* | 9/2011 | Freimuth | G06F 9/45558 |
| | | | 709/223 |
| 2013/0191340 A1* | 7/2013 | Ammanur | G06F 7/00 |
| | | | 707/638 |
| 2014/0040892 A1* | 2/2014 | Beset | G06F 9/455 |
| | | | 718/1 |
| 2014/0215073 A1* | 7/2014 | Dow | H04L 67/10 |
| | | | 709/226 |
| 2015/0019301 A1* | 1/2015 | Jung | G06Q 10/06393 |
| | | | 705/7.39 |
| 2016/0098297 A1* | 4/2016 | Yuyitung | G06F 11/3442 |
| | | | 718/104 |
| 2016/0378537 A1* | 12/2016 | Zou | G06F 9/4856 |
| | | | 718/1 |

* cited by examiner

|  | 2421 | 2422 | 2423 | 2424 | 2425 | 2426 | 2427 |
|---|---|---|---|---|---|---|---|
|  | ID | Type | OS Name | OS Version | Application Name | Application Version | Location |
| 242A | 01 | DB | Ubuntu | 13.04 | MySQL | 2.4 | Storage System 01 Volume 01 |
| 242B | 02 | DB | CentOS | 6.4 | MySQL | 2.4 | Storage System 01 Volume 02 |
| 242C | 03 | DB | CentOS | 6.4 | MySQL | 2.5 | Storage System 01 Volume 03 |
| 242D | 04 | Web Server | SUSE | 10.0 | Apache | 2.0 | Storage System 02 Volume 01 |
| 242E | 05 | Web Server | SUSE | 10.0 | Apache | 2.1 | Storage System 02 Volume 02 |
|  | : | : | : | : | : | : | : |

| | 2431 | 2432 | 2433 | 2434 | 2435 | 2436 | 2437 | 2438 |
|---|---|---|---|---|---|---|---|---|
| | ID | VM Type | Processor Type | Processor Performance | # of Processors | Memory | Max IOPS | Unit Price |
| 243A | 01 | Normal | Normal | 1 | 2 | 4GB | 50,000 | 10 |
| 243B | 02 | High Memory | High | 10 | 8 | 32GB | 100,000 | 30 |
| 243C | 03 | High CPU | GPU | 20 | 16 | 8GB | 100,000 | 80 |
| 243D | 04 | High I/O | High | 10 | 16 | 8GB | 500,000 | 90 |
| | : | : | : | : | : | : | : | : |

| | ID | Port (Gbps) | Cache (GB) | Array Group (TB) |
|---|---|---|---|---|
| 251A | 01 | A(8),B(8),C(8),D(8) | C-01 (160), C-02 (128) | AG-002(300), AG-102(300) |
| 251B | 02 | A(8), B(8) | C-01 (128) | AG-001(200), AG-101(500) |
| 251C | 03 | A(8), B(8) | C-01 (32) | AG-004(1000), AG-005(500) |
| | : | : | : | : |

Fig. 5

|       | Storage ID | Volume ID | Cache (GB) | Capacity (TB) |
|-------|------------|-----------|------------|---------------|
| 252A  | 01         | 01        | 32         | 80            |
| 252B  | 01         | 02        | 32         | 80            |
| 252C  | 02         | 01        | 16         | 120           |
| 252D  | 02         | 02        | 16         | 120           |
| 252E  | 02         | 03        | 8          | 40            |
|       | :          | :         | :          | :             |

Fig. 6

| | ID | CPU (# of core, Type) | Memory | Port (Gbps) |
|---|---|---|---|---|
| 253A | 01 | 12 Core, Normal | 32GB | A(4), B(4) |
| 253B | 02 | 32 Core, High | 256 GB | A(8), B(8) |
| 253C | 03 | 24 Core, High | 256 GB | A(8) |
| 253D | 04 | 24 Core, High | 128 GB | A(16), B(16) |
| | : | : | : | : |

| | 2541 | 2542 | 2543 | 2544 | 2545 |
|---|---|---|---|---|---|
| | ID | Physical Server ID | CPU (# of core) | Memory | Port (Gbps) |
| 254A | 01 | 01 | 2 Core | 4 GB | A(4) |
| 254B | 02 | 01 | 8 Core | 32 GB | B(8) |
| 254C | 03 | 02 | 16 Core | 8 GB | A(8) |
| 254D | 04 | 02 | 16 Core | 8 GB | A(16) |
| | : | : | : | : | : |

Fig. 8

|  | Application ID (2551) | Application Name (2552) | Catalog ID (2553) | Virtual Server ID (2554) | Virtual Server Name (2555) | Virtual Server Port (2556) | Storage ID (2557) | Storage Port ID (2558) | Volume ID (2559) |
|---|---|---|---|---|---|---|---|---|---|
| 255A | 1 | OLTP-B | 2 | 01 | OLTP-B-1 | A | 01 | A | 011 |
|  |  |  |  | 02 | OLTP-B-2 | A | 01 | C | 021 |
|  |  |  |  |  |  | B | 02 | C | 022 |
| 255B | 2 | Web-C | 4 | 03 | WebDB | A | 02 | B | 052 |
|  |  |  |  |  |  | A | 01 | A | 055 |
| 255C | 3 | OLAP-E | 3 | 04 | OLAP-E-1 | C | 03 | D | 063 |
|  |  |  |  | 05 | OLAP-E-2 | B | 02 | C | 105 |
| 255D | 2 | Web-C | 4 | 06 | WebLogic | D | 01 | A | 120 |
|  |  |  |  | 07 | WebFront-1 | B | 03 | A | 050 |
|  |  |  |  |  |  | B | 03 | B | 051 |
| 255E | 4 | DEV-C | 6 | 08 | Dev-C-1 | C | 04 | C | 023 |
|  |  |  |  | 09 | Dev-C-2 | A | 05 | D | 225 |
| 255F | 2 | Web-C | 4 | 10 | WebFront-2 | C | 05 | E | 221 |
| 255G | 5 | Mail-A | 5 | 11 | Mail-A-1 | D | 04 | A | 235 |
|  |  |  |  | 12 | Mail-A-2 | E | 06 | A | 248 |
|  |  |  |  |  |  | A | 04 | B | 249 |
|  |  |  |  | 13 | Mail-A-3 | A | 03 | C | 101 |
|  |  |  |  | 14 | Mail-A-4 | B | 04 | B | 111 |
|  | : | : | : | : | : | : | : | : | : |

| Virtual Server ID (2561) | Parent Virtual Server ID (2562) |
|---|---|
| 256A: 01 | - |
| 256B: 02 | 01 |
| 256C: 03 | 02 |
| 256D: 04 | 02 |
| : | : |

| Virtual Server ID (2571) | Paired Virtual Server ID (2572) |
|---|---|
| 257A: 05 | 03 |
| : | : |

Fig. 11

| Storage ID | Volume ID | History ID | Cache Usage | Array Group Usage | Port Usage |
|---|---|---|---|---|---|
| 01 | 01 | 0 | 15% | 30% | 50% |
| | | 1 | 20% | 34% | 34% |
| | | 2 | 23% | 45% | 40% |
| | | : | : | : | : |
| : | : | : | : | : | : |

Fig. 12

| Server ID | Physical Server Flag | History ID | CPU Usage | | | Memory Usage | Disk Usage | Port Usage |
|---|---|---|---|---|---|---|---|---|
| | | | CPU 0 | ... | CPU 31 | | | |
| 01 | YES | 0 | 14% | ... | 22% | 24% | 50% | 30% |
| | | 1 | 15% | ... | 18% | 30% | 70% | 34% |
| | | 2 | 14% | ... | 19% | 25% | 66% | 40% |
| | | : | : | ... | : | : | : | : |
| 02 | NO | 0 | 20% | ... | 30% | 50% | 10% | 20% |
| | | 1 | 21% | ... | 10% | 43% | 20% | 22% |
| | | 2 | 25% | ... | 15% | 30% | 14% | 30% |
| | | : | : | ... | : | : | : | : |
| : | : | : | : | ... | : | : | : | : |

Fig. 13

| | | 1600-B | | | |
|---|---|---|---|---|---|
| 1610-B | Application Type: | Web Server | | | |
| 1620-B | Application Name: | Web-A | | | |
| 1630-B | Number of VMs: | 4 | | | |
| 1640-B | VMs being provisioned: | 1641-B | 1642-B | 1643-B | 1644-B |
| | | VM Name | CPU | Memory | Capacity |
| 164A-B | | Web-A-1 | 16 x High | 8GB | 2TB |
| 164B-B | | Web-A-2 | 16 x High | 8GB | 2TB |
| 164C-B | | Web-A-3 | 16 x High | 8GB | 2TB |
| 164D-B | | Web-A-4 | 16 x High | 8GB | 2TB |
| 1650-B | Unit Cost: | 360 | | | |

OK — 1660-B  Cancel — 1670-B  Back — 1680-B

Fig. 15

| Storage ID | Volume ID | Original Storage ID | Original Volume ID | History ID | Cache Usage | Array Group Usage | Port Usage |
|---|---|---|---|---|---|---|---|
| 02 | 02 | 01 | 01 | 0 | 15% | 30% | 50% |
| | | | | 1 | 20% | 34% | 34% |
| | | | | 2 | 23% | 45% | 40% |
| | | | | : | : | : | : |
| : | : | : | : | : | : | : | : |

Fig. 24

| Server ID | Original Server ID | Physical Server Flag | History ID | CPU Usage | | | Memory Usage | Disk Usage | Port Usage |
| --- | --- | --- | --- | --- | --- | --- | --- | --- | --- |
| | | | | CPU 0 | ... | CPU 31 | | | |
| 01 | - | YES | 0 | 14% | ... | 22% | 24% | 50% | 30% |
| | | | 1 | 15% | ... | 18% | 30% | 70% | 34% |
| | | | 2 | 14% | ... | 19% | 25% | 66% | 40% |
| | | | : | : | ... | : | : | : | : |
| 03 | 02 | NO | 0 | 20% | ... | 30% | 50% | 10% | 20% |
| | | | 1 | 21% | ... | 10% | 43% | 20% | 22% |
| | | | 2 | 25% | ... | 15% | 30% | 14% | 30% |
| | | | : | : | ... | : | : | : | : |
| : | | : | : | : | ... | : | : | : | : |

Fig. 25

| Storage ID (25A1) | Volume ID (25A2) | Original Storage ID (25A3) | Original Volume ID (25A4) | Time Period (25A5) | Cache Usage (25A6) | Array Group Usage (25A7) | Port Usage (25A8) |
|---|---|---|---|---|---|---|---|
| 02 | 02 | 01 | 01 | 0:00 AM - 7:00 AM | > 30% | > 30% | > 20% |
|  |  |  |  | 7:00 AM - 0:00 PM | > 70% | > 70% | > 80% |
|  |  |  |  | 0:00 PM - 5:00 PM | > 80% | > 70% | > 75% |
|  |  |  |  | : | : | : | : |
| : | : | : | : | : | : | : | : |

Fig. 26

METHOD AND APPARATUS FOR MANAGING IT INFRASTRUCTURE IN CLOUD ENVIRONMENTS BY MIGRATING PAIRS OF VIRTUAL MACHINES

CROSS-REFERENCE TO RELATED APPLICATIONS

This application is a U.S. National Stage entry of PCT Application No. PCT/US2014/050956, filed on Aug. 23, 2014, the contents of which are incorporated by reference.

BACKGROUND

Field

The example implementations described herein are related generally to computer systems and, more particularly, to an information technology (IT) management infrastructure in a cloud computing environment.

Related Art

Cloud computing is widely used in the related art. There are several related art solutions for managing cloud computing environments. One example related art solution for cloud environment management is as follows:

- an infrastructure administrator is assigned to manage IT resources and store the IT resources in resource pools; and
- an application administrator obtains IT resources from the resource pools using a self-service portal to execute his/her applications.

Generally, the infrastructure administrators will optimize configurations of IT resources to satisfying Service Level Agreements (SLAs) of the cloud services they offer. This is done, for example, by migrating virtual servers or virtual machines (VMs) from one physical server (or one hypervisor) to another different physical server (or another different hypervisor).

Further, some application administrators utilize computing environments (i.e., IT resources provided from the cloud and software, including operating systems (OS), middleware and certain applications on them) as immutable environments. In other words, the application administrator does not modify any configurations and settings of the environment once it is in use. Instead, the application administrator will create a new environment by obtaining additional IT resources (i.e., additional computing environments) from the resource pools, deploying software on the additional IT resources and replacing the existing environments with the new computing environment. This replacement may be done by switching workloads from the existing environment to the new environment by using network routers and/or load balancers. By replacing the computing environment, rather than reconfiguring the computing environment, the operation status of the environments may be simplified.

In related art cloud computing environments, the infrastructure administrators cannot know whether application administrators are treating their computing environments as immutable environments (i.e., replacing computing environments with new environments, rather than reconfiguring the existing environments).

Further, in related art cloud computing environments, an infrastructure administrator cannot distinguish a computing environment (e.g. a virtual machine) created by the application administrator as a replacement for an existing computing environment (e.g., a virtual machine), from a computing environment, created to be a new computing environment (i.e., a virtual machine not created to replace an existing virtual machine).

In related art cloud computing environments, the infrastructure administrator can make optimizations of IT infrastructures that become inefficiencies due to replacements of VMs done by application administrators. For example, an infrastructure administrator may assign greater IT resources to an existing VM and fewer resources to a newly created VM, with less performance requirements. However, as the newly created VM takes over workload from the existing VM, the new VM requires more resources, while the existing VM requires fewer resources, contrary to the optimizations previously completed by the infrastructure administrator.

Further, infrastructure administrators may be unable to apply existing know-how (or policies) for managing existing VMs after they are replaced by new VMs because infrastructure administrators cannot recognize that the new VM is a replacement for the existing VM. The infrastructure administrator may only recognize that some new VMs have been created and some existing VMs have been deleted, but cannot identify specific replacements. As a result, existing know-how and/or policies may be lost when existing VMs are replaced.

SUMMARY

Aspects of the present application may a management computer coupled to a plurality of servers, which manage a plurality of virtual machines. The management computer may include a memory configured to store application type information indicative of an application type of each of the plurality of virtual machines. The memory may also be configured to store virtual machine topology information indicative of a topology of the plurality of virtual machines. The management computer may also include a processor configured to make a relationship between a virtual machine of the plurality of virtual machines and another virtual machine of the plurality of virtual machines, which has a probability to replace the virtual machine. The relationship may be made based on an association between the virtual machine and the another virtual machine in the virtual machine topology information. The relationship may also be made based on an application type of the virtual machine and an application type of the another virtual machine in the application type information.

Aspects of the present application may also include a method. The method may include determining, by a computing device, application type information indicative of an application type of each of a plurality of virtual machines. The method may further include determining, by the computing device, virtual machine topology information indicative of a topology of the plurality of virtual machines. The method may also include making, by the computing device, a relationship between a virtual machine of the plurality of virtual machines and another virtual machine of the plurality of virtual machines, which has a probability to replace the virtual machine. The relationship may be made based on an association between the virtual machine and the another virtual machine in the virtual machine topology information. The relationship may also be made based on an application type of the virtual machine and an application type of the another virtual machine in the application type information.

Aspects of the present application may include a computer program containing instructions for executing a process. The instructions may include determining application type information indicative of an application type of each of a plurality of virtual machines. The instructions may further include determining virtual machine topology information indicative of a topology of the plurality of virtual machines. The instructions may also include making a relationship between a virtual machine of the plurality of virtual machines and another virtual machine of the plurality of virtual machines, which has a probability to replace the virtual machine. The relationship may be made based an association between the virtual machine and the another virtual machine in the virtual machine topology information. The relationship may also be made based an application type of the virtual machine and an application type of the another virtual machine in the application type information.

BRIEF DESCRIPTION OF THE DRAWINGS

FIG. 3 illustrates an example image catalog table, in accordance with an example implementation of the present application.

FIG. 4 illustrates an example VM template table, in accordance with an example implementation of the present application.

FIG. 5 illustrates an example storage array table, in accordance with an example implementation of the present application.

FIG. 6 illustrates an example storage volume table, in accordance with an example implementation of the present application.

FIG. 7 illustrates an example physical server table, in accordance with an example implementation of the present application.

FIG. 8 illustrates an example virtual server table, in accordance with an example implementation of the present application.

FIG. 9 illustrates an example mapping table, in accordance with an example implementation of the present application.

FIG. 10 illustrates an example virtual server topology table, in accordance with an example implementation of the present application.

FIG. 11 illustrates an example virtual server pair table, in accordance with an example implementation of the present application.

FIG. 12 illustrates an example storage performance table, in accordance with an example implementation of the present application.

FIG. 13 illustrates an example server performance table, in accordance with an example implementation of the present application.

FIG. 15 illustrates an example confirmation GUI, in accordance with an example implementation of the present application.

FIG. 24 illustrates an example storage performance table, in accordance with the second example implementation of the present application.

FIG. 25 illustrates an example server performance table, in accordance with the second example implementation of the present application.

FIG. 26 illustrates an example storage thresholds table, in accordance with an example implementation of the present application.

DETAILED DESCRIPTION

Some example implementations are described with reference to drawings. The example implementations that are described herein do not restrict the inventive concept, and one or more elements that are described in the example implementations may not be essential for implementing the inventive concept. Further, although certain elements may be referred to in the singular form, the elements are not intended to be limited to the singular and may also be implemented with one or more of the same element, depending on the desired implementation.

Some example implementations described herein are directed to methods and apparatuses which may optimize IT infrastructures by considering the possibility or probability of replacement of the existing VMs with new VMs. For example, in some example implementations, a management program that deploys new VMs may identify candidate VMs potentially being replaced. Further, the management program may score the possibility of replacement and pair the new VMs to the candidate VMs, if it judges the possibility of replacement to be high. Further, in some example implementations, the management program may migrate VMs and storage volumes used by the existing VMs and newly created VMs to other physical servers and storage arrays in pairs.

Further, some example implementations described herein may also provide methods and apparatuses which may allow the inheriting of management policies from existing VMs and the leveraging of the inherited management policies to manage new VMs, which may replace the existing VMs. For example, in some example implementations the management program may inherit management policies from existing VMs being replaced and leverage them to manage new VMs, which replace the existing VMs.

First Example Implementation

This first example implementation includes a management program, which may optimize IT infrastructures by considering the possibility that newly created VMs are replacements of existing VMs.

Figure 1A:
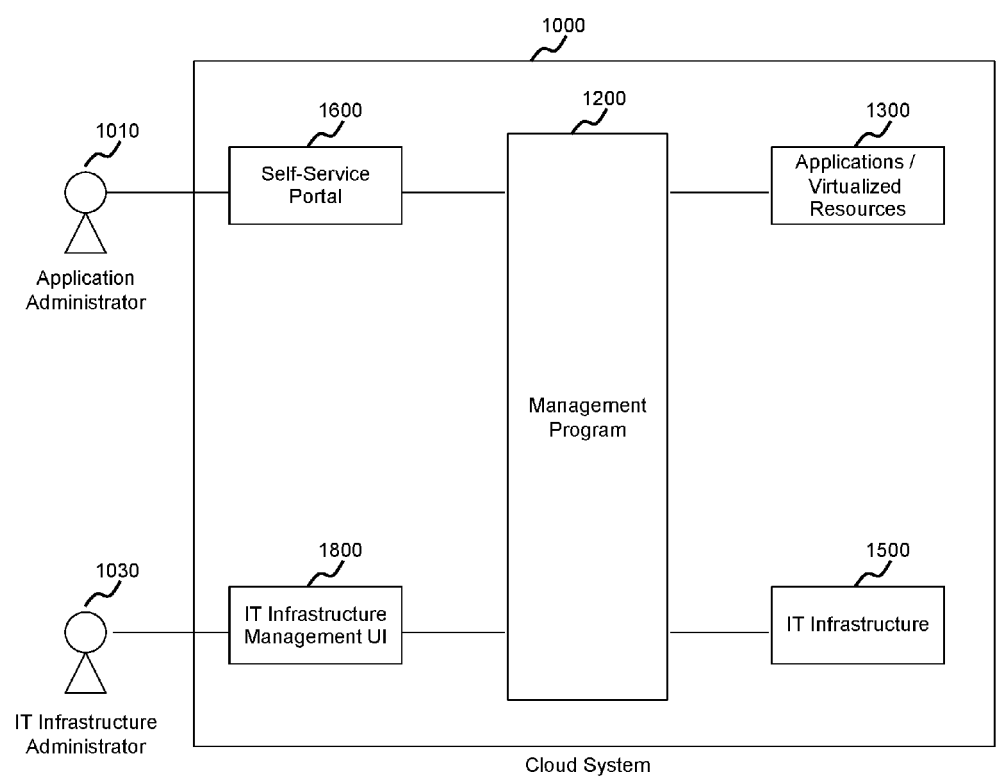
FIG. 1A illustrates an example logical configuration of a system in which one or more example implementations of the present application may be applied.

FIG. 1A illustrates an example logical configuration of a cloud system 1000 in which one or more example implementations of the present application may be applied. The Cloud system 1000 may include a management program 1200 coupled to one or more applications and virtualized resources 1300, an IT infrastructure 1500, a self-service portal 1600 and an IT infrastructure management user interface 1800.

As illustrated in FIG. 1A, an application administrator 1010 may interact with, or use, the cloud system 1000 via the self-service portal 1600. Further, the IT infrastructure administrator 1030 may interact with, or use, the cloud system 1000 via the IT infrastructure management user interface 1800.

Figure 1B:
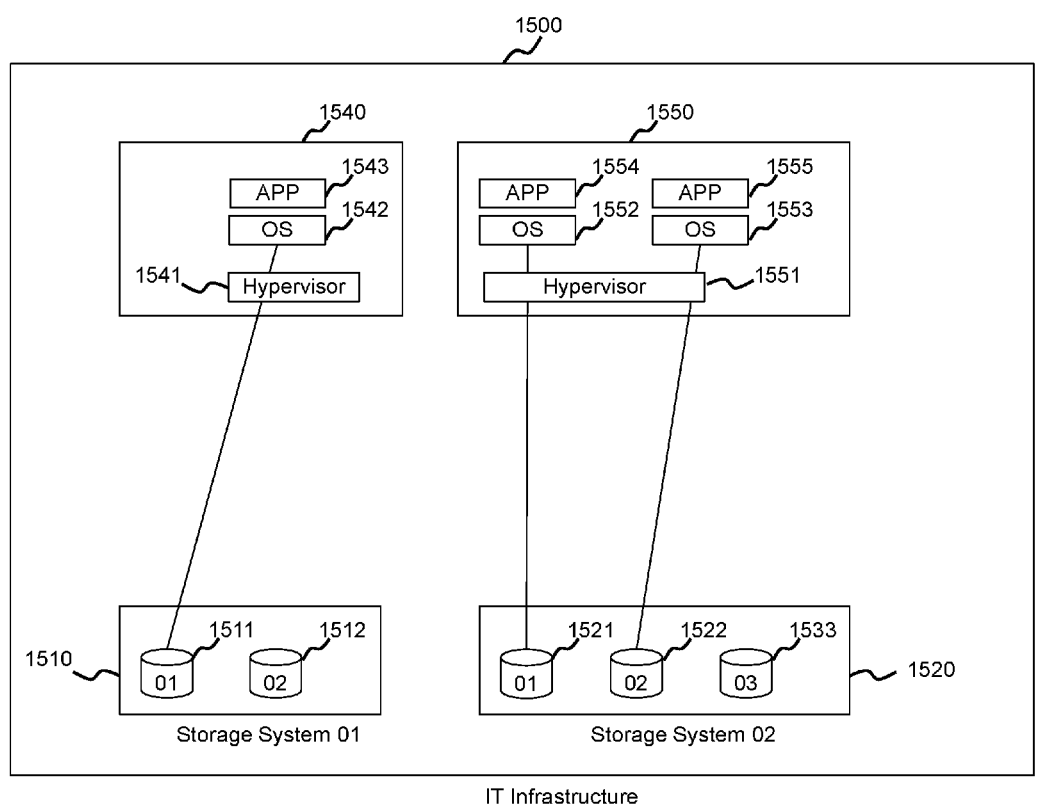
FIG. 1B illustrates an example logical configuration of the IT infrastructure of the system of FIG. 1A.

FIG. 1B illustrates an example logical configuration of the IT infrastructure 1500 of the cloud system 1000 of FIG. 1A. The IT infrastructure 1500 may include multiple storage systems such as storage system 01 (1510) and storage system 02 (1520) and multiple servers 1540, 1550. Storage system 01 (1510) may include two storage volumes 1511, 1512. Storage system 02 may include three Storage volumes 1521, 1522, 1533.

As illustrated, server 1540 may be communicatively coupled to storage volume 1511 of storage system 1 (1510). A hypervisor (also referred to herein as a virtual machine monitor (VMM)) 1541 may be running on the server 1540. An application (APP) 1543, operating system (OS) 1542 may be running on the hypervisor 1541. Application 1543 may use storage volume 1511 of the storage system 01 (1510).

Further, server 1550 may be communicatively coupled to storage volumes 1521 and 1522 of storage system 2 (1520). Hypervisor 1551 may be running on the server 1550. Applications 1554, 1555, and operating systems (OS) 1552 and 1553 may be running on the hypervisor 1551. Application 1554 may use storage volume 1521 of the storage system 02 (1520). Further, Application 1555 may use storage volume 1522 of the storage system 02 (1520).

Figure 2A:
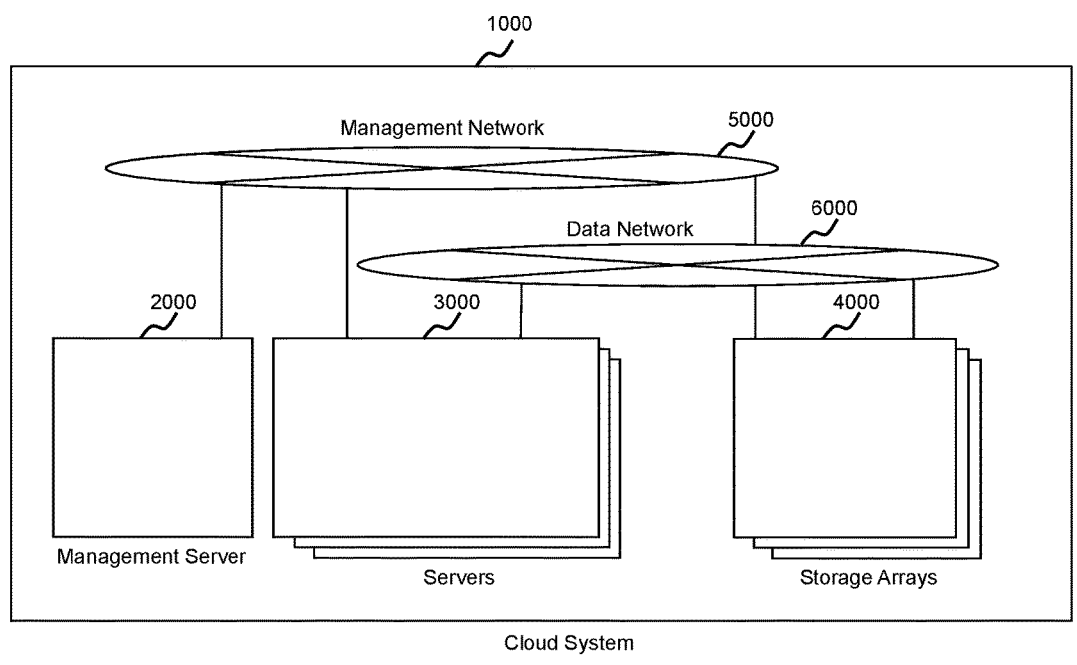
FIG. 2A illustrates an example physical configuration of a cloud system according to one or more example implementations of the present application.

FIG. 2A illustrates an example physical configuration of a cloud system 1000 according to one or more example implementations of the present application. The cloud system 1000 may include a management server 2000, one or more servers 3000, one or more storage arrays 4000, a management network 5000 and a data network 6000.

The servers 3000 and the storage arrays 4000 may be connected to each other via the data network 6000. The data network 6000 is not particularly limited to a specific type of network and may include a LAN (Local Area Network), a WAN (Wide Area Network), or any other network that may be apparent to a person of ordinary skill in the art.

The management server 2000, the servers 3000 and the storage arrays 4000 may be connected to each other via management network 5000. The management network 5000 may also be include a LAN (Local Area Network), a WAN (Wide Area Network), or any other network that may be apparent to a person of ordinary skill in the art. Network is usually LAN.

The management network 5000 and data network 6000 are illustrated as separate networks in this example implementation. However, example implementations of the present application are not limited to this configuration and may be formed as a single combined network.

In this example implementation, the management server 2000 and the servers 3000 are illustrated as being separate servers. However, example implementations of the present application are not limited to this configuration and may other configurations. For example, a single server hosting a management program may be used. Management server 2000 may also be in the form of a management computer configured to manage multiple virtual machines.

In this example implementation, the servers 3000 and the storage arrays 4000 are illustrated as separate. However, example implementations of the present application are not limited to this configuration and may include other configurations. For example, the servers 3000 and the storages arrays 4000 can be combined into a single storage system.

Figure 2B:
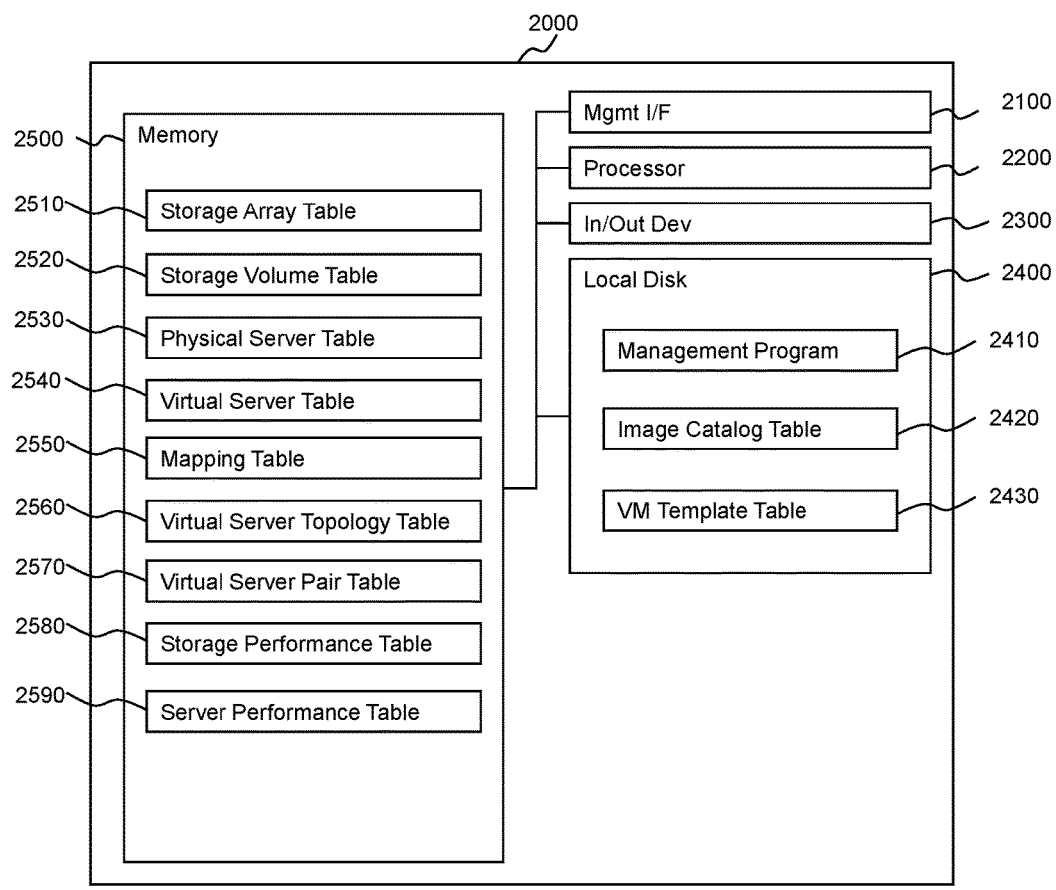
FIG. 2B illustrates a first example implementation of a management server for the cloud system of FIG. 2A.

FIG. 2B illustrates a first example implementation of a management server 2000 for the cloud system 1000 of FIG. 2A. The management server 2000 may include a management interface (I/F) 2100, a processor (such as a central processing unit (CPU)) 2200, an input and output device 2300, a local disk 2400 and a memory 2500. The management interface 2100 may be used to interface with the management network 5000 illustrated in FIG. 2A. The input and output device 2300 is not particularly limited and may be any type of user interface, which may be apparent to a person of ordinary skill in the art, such as a monitor, a keyboard, a mouse, etc.

The local disk 2400 may contain a management program 2410, an image catalog table 2420 and a VM template table 2430. Image catalog table 2420 and VM template table 2430 may be loaded into the memory 2500 and used by the management program 2410. The image catalog table 2420 is discussed in greater detail below with respect to FIG. 3. The VM template table 2430 is discussed in greater detail below with respect to FIG. 4

The management program 2410 may be loaded into the memory 2500 and executed by the processor 2200 to perform management procedures. The procedures of the management program 2410 are discussed in greater detail below. In some example implementations, the management program 2410 may be analogous to the management program 1200 identified in FIG. 1.

The memory 2500 may contain a storage array table 2510, a storage volume table 2520, a physical server table 2530, a virtual server table 2540, a mapping table 2550, a virtual server topology table 2560, a virtual server pair table 2570, a storage performance table 2580 and a server performance table 2590.

The storage array table 2510 is discussed in greater detail below with respect to FIG. 5. The storage volume table 2520 is discussed in greater detail below with respect to FIG. 6. The physical server table 2530 is discussed in greater detail below with respect to FIG. 7. The virtual server table 2540 is discussed in greater detail below with respect to FIG. 8.

The mapping table 2550 is discussed in greater detail below with respect to FIG. 9. The virtual server topology table 2560 is discussed in greater detail below with respect to FIG. 10. The virtual server pair table 2570 is discussed in greater detail below with respect to FIG. 11. The storage performance table 2580 is discussed in greater detail below with respect to FIG. 12. The server performance table 2590 is discussed in greater detail below with respect to FIG. 13.

FIG. 3 illustrates an example image catalog table 2420, in accordance with an example implementation of the present application. The image catalog table 2420 may be used when the application administrator 1010 deploys applications, or sends a deployment request, by using the self-service portal 1600. When used, the image catalog table 2420 is loaded from the local disk 2400 into the memory 2500 of the management server 2000.

As illustrated, the image catalog table 2420 includes columns providing information on the image catalogs. Column 2421 provides the identification information, or identifications, of the catalogs. Column 2422 provides the types of the applications. Further, column 2423 provides the names of operating systems on which applications run, and column 2424 provides the operating system versions on which applications run. Column 2425 provides the names of applications and column 2426 shows the versions of applications. Column 2427 provides the locations of storage volumes in which the applications are contained. These storage volumes are sometimes referred to as "golden images".

Each row (242A-242E) of the image catalog table 2420 corresponds with one of the image catalogs. For example, row 242A shows the catalog of a database type of application. This catalog includes the application MySQL, version 2.4 running on an Ubuntu operating system version 13.04. This image is located on volume 01 of storage system 01.

FIG. 4 illustrates an example VM template table 2430, in accordance with an example implementation of the present application. The templates represented in the VM template table 2430 describe the resource configurations of several types of VMs. When used, this table is loaded from local disk 2400 to memory 2500 of the management server 2000.

As illustrated, the VM template table 2430 includes a number of columns providing information on the VM templates. Column 2431 provides the identifications of the templates and column 2432 provides the VM types. Column 2433 provides the processor types. The values of column 2433 can be normal, high memory, high CPU and High I/O. Column 2434 provides the processor performance. The values of column 2434 are relative values on the basis of a normal CPU. Column 2435 shows the numbers of processors. Column 2436 provides the capacities of the memories and column 2437 provides the maximum Input/output Operations per Second (TOPS). Further, column 2438 shows the unit prices.

Each row (243A-243D) of the VM template table 2430 shows the resource configuration of each type of VM. For example, row 243A shows the configuration of a normal type of VM. This type of VM may include two normal processors and 4 GB memory. The unit price of this type of VM is 10.

FIG. 5 illustrates an example physical storage array table 2510, in accordance with an example implementation of the present application. This physical storage array table 2510 may be created in the memory 2500 by the management program 2410.

As illustrated, the physical storage array table 2510 includes a number of columns providing information on the physical storage arrays. Column 2511 provides the identification information, or identifications of the physical storage arrays. Column 2512 provides the port resources of each physical storage array. Column 2513 provides the cache resources of each physical storage array. Column 2514 provides the array group resources of each physical storage array.

Each row (251A-251C) of the physical storage array table 2510 shows the configuration of each physical storage array. For example, row 251A shows the configuration of physical storage array 01. The physical storage array has a data rate of 8 Gigabits per second (Gbps) at port A, B, C and D, 160 Gigabytes (GB) of C-01 cache and 128 GB of C-02 cache and 300 Terabytes (TB) of array group AG-002 and 300 TB of array group AG-102.

FIG. 6 illustrates an example storage volume table 2520, in accordance with an example implementation of the present application. The storage volume table 2520 may be created in the memory 2500 by the management program 2410.

As illustrated, the storage volume table 2520 includes a number of columns providing information on the storage volumes. Column 2521 provides the identification information, or identifications of the virtual storage arrays owning the storage volumes. Column 2522 provides the identifications of the storage volumes. Column 2523 provides the cache resources assigned to each storage volume. Column 2524 provides the capacity of each storage volume.

Each row (252A-252E) of the storage volume table 2520 shows the configuration of each storage volume. For example, row 252A shows the configuration of storage volume 01 of storage array 01. This storage volume has 32 GB of cache resources and 80 TB of capacity.

FIG. 7 illustrates an example physical server table 2530, in accordance with an example implementation of the present application. This physical server table 2530 may be created in the memory 2500 by the management program 2410.

As illustrated, the physical server table 2530 includes a number of columns providing information on the physical servers. Column 2531 provides the identification information, or identifications, of the physical servers. Column 2532 provides the numbers of cores and types of CPU of each physical server. Column 2533 provides the capacities of memories of each physical server. Column 2534 provides the port resources of each physical server.

Each row (253A-253D) of the physical server table 2530 shows the configuration of each physical server. For example, row 253A shows the configuration of physical server 01. The physical server has 12 cores of Normal CPUs, 32 GB of memory, a data rate of 4 Gbps at port A and B, and deduplication functionality installed.

FIG. 8 illustrates an example virtual server table 2540, in accordance with an example implementation of the present application. The virtual server table 2540 may be created in the memory 2500 by the management program 2410.

As illustrated, the virtual server table 2540 includes a number of columns providing information on the virtual servers (virtual machines (VM)). Column 2541 provides the identifications of the virtual servers. Column 2542 provides the identifications of the physical servers on which the virtual servers are running. Column 2543 provides numbers of CPU cores assigned to each virtual server. Column 2544 provides capacities of memories assigned to each virtual server. Column 2545 provides the port assigned to each virtual server.

Each row (254A-254D) of the virtual server table 2540 shows the configuration of each virtual server 01. For example, row 254A shows the configuration of virtual server 01. The virtual server is hosted on the physical server 01 and has 2 CPU cores, 4 GB of memory and a data rate of 4 Gbps at port A.

FIG. 9 illustrates an example mapping table 2550, in accordance with an example implementation of the present application. The mapping table 2550 may be created in the memory 2500 by the management program 2410.

As illustrated, the mapping table 2550 includes a number of columns mapping relationship between the applications, virtual servers (VMs), and storage volumes. Column 2551 provides the identifications of the applications. Column 2552 provides the names of the applications. The names of the application may be specified in the application name field 1620-A of the GUI 1600-A (discussed below with respect to FIG. 14) of the self-service portal 1600 by the application administrator 1010.

Column 2553 provides the identification of the image catalogs. An application type may be selected in the application type field 1610-A of the GUI 1600-A (discussed below with respect to FIG. 14) of the self-service portal 1600 by the application administrator 1010. By matching application type information and the type column 2422 in the image catalog table 2420, the identification of the image catalog may be determined.

Column 2554 provides the identifications of the virtual servers on which the applications are running.

Column 2555 provides the names of the virtual servers. In this example implementation, these names may be automatically created based on application name by the management program 2410. But example implementations are not limited to this configuration, and may have other configurations. For example, the application administrator 1010 can specify the name of each virtual server.

Column 2556 provides the identifications of the ports of the virtual servers. Column 2557 provides the identifications of the storage arrays. Column 2558 provides the identifications of the ports of the storage arrays. Column 2559 provides the identifications of the storage volumes.

Each row (255A-255G) of the mapping table 2550 provides the end-to-end mapping between applications and storage volumes. For example, row 255B shows that application 2 has the name of "Web-C", may be created from image catalog 4, and is running on the virtual server 03 whose name is "WebDB". Further, virtual server 03 has two storage volumes 052 and 055 assigned for application 2. The storage volume 052 of storage array 02 is assigned to the virtual server 03 through port B of the storage array and port A of the virtual server. The storage volume 055 of storage array 01 is assigned to the virtual server 03 through port A of the storage array and port A of the virtual server.

FIG. 10 illustrates an example virtual server topology table 2560, in accordance with an example implementation of the present application. The virtual server topology table 2560 may be created in the memory 2500 by the management program 2410.

As illustrated, the mapping table 2560 includes a number of columns providing mapping information on the topology or interconnection of the virtual servers. Column 2561 provides the identifications of the virtual servers. Column 2562 provides the identifications of the parent virtual servers. Each row (256A-256D) shows the topology among the virtual servers. For example, row 256B shows the virtual server 02 is connected to the virtual server 01.

FIG. 11 illustrates an example virtual server pair table 2570, in accordance with an example implementation of the present application. The virtual server pair table 2570 may be created in the memory 2500 by the management program 2410.

As illustrated, the virtual server pair table 2570 includes a number of columns providing pairing information indicating a pairing between two of the virtual servers. Column 2571 provides the identifications of the virtual servers. Column 2572 provides the identifications of the paired virtual servers.

Each row of the virtual server pair table 2570 shows the pair relationships between virtual servers. For example, row 257A shows that the virtual server 05 is paired to the virtual server 03. The procedure of pairing virtual servers is discussed in greater detail below.

FIG. 12 illustrates an example storage performance table 2580, in accordance with an example implementation of the present application. The storage performance table 2580 may be created in the memory 2500 by the management program 2410.

As illustrated, the storage performance table 2580 includes a number of columns providing current and historical performance information for the storage volumes. Column 2581 provides the identifications of the storage arrays. Column 2582 provides the identifications of the storage volumes. Column 2583 provides the identifications of historical performance data of the storage volumes. Timestamps may be used as the history ID in column 2583. Column 2584 provides the usage rate of the caches assigned to the storage volumes. Column 2585 provides the usage rate of the array group from which the storage volumes are curved. Column 2586 provides the usage rate of the ports assigned to the storage volumes.

Each row of the storage performance table 2580 shows the historical performance data of each storage volume. For example, row 258A shows the performance data of storage volume 01 of storage array 01 which has at least three pieces of historical data (from 0 to 2).

FIG. 13 illustrates an example server performance table 2590, in accordance with an example implementation of the present application. The server performance table 2590 may be created in the memory 2500 by the management program 2410.

As illustrated, the server performance table 2590 includes a number of columns providing current and historical performance information for the physical and virtual servers. Column 2591 provides the identifications of the physical and/or virtual servers. Column 2592 provides flags indicating whether the servers are physical servers or not. In this example implementation, if the value of "YES" is contained then the server is a physical server and if the value of "NO" is contained then the server is a virtual server. In other example implementations, this relation may be reversed with a value of "YES" indicating a virtual server and a value of "NO" indicating a physical server.

Column 2593 provides the identification of historical performance data of the servers. Timestamps may be used as the history ID 2593. Column 2594 provides the usage rate of each of the CPUs of the servers. Column 2595 provides the usage rate of the memories of the servers. Column 2596 provides the usage rate of the disk of the servers. Column 2597 provides the usage rate of the ports of the servers.

Each row (259A-259B) of the server performance table 2590 shows the historical performance data of each server. For example, row 259A shows the performance data of server 01 which is a physical server and has at least three pieces of historical data (from 0 to 2).

Figure 14:
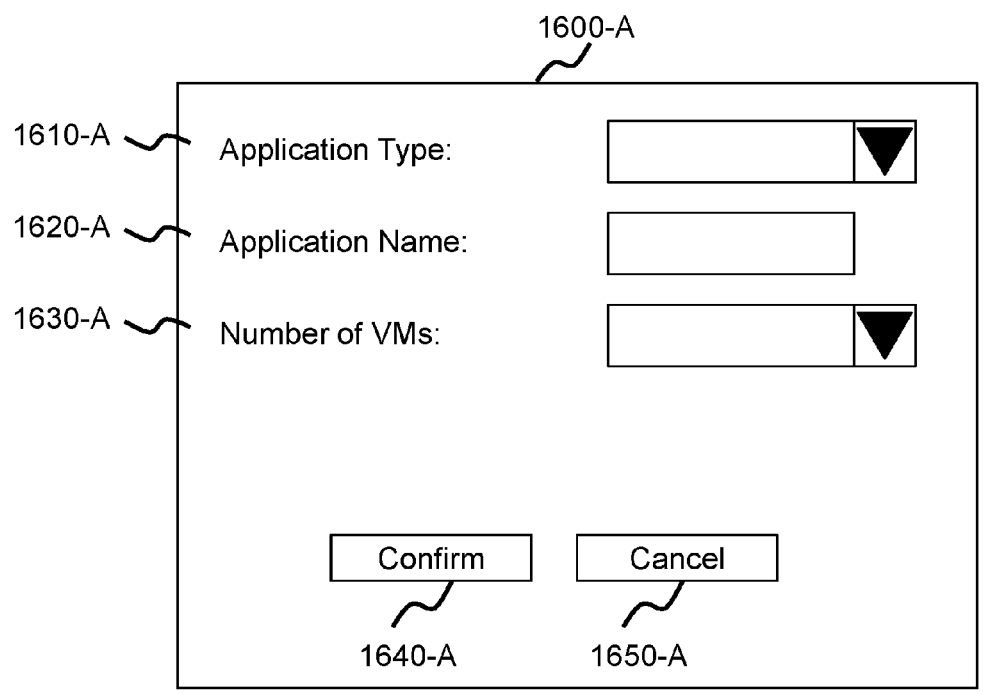
FIG. 14 illustrates an example graphical user interface (GUI) of a self-service portal, in accordance with an example implementation of the present application.

FIG. 14 illustrates an example graphical user interface (GUI) 1600-A of a self-service portal 1600, in accordance with an example implementation of the present application. This GUI 1600-A may be used when the application administrator 1010 deploys applications on the cloud system 1000. In some example implementations, the application administrator may select an application type 1610-A, for example "Web Server". Candidate application types may be displayed based on the type information 2422, OS name information 2423, OS version information 2424, application name information 2425 and application version information 2426 illustrated in the image catalog table 2420.

The application administrator 1010 may then input an application name 1620-A, such as "Web-A", as illustrated in FIG. 15 below. The application administrator 1010 may the select a number of the VMs 1630-A to be created.

The management program 2410 may display the confirmation GUI 1600-B illustrated in FIG. 15 if the "Confirm" button 1640-A is selected. Conversely, if the "Cancel" button 1650-A of FIG. 14 is selected, the management program 2410 may cancel the deployment process.

FIG. 15 illustrates an example confirmation GUI 1600-B of the self-service portal 1600, in accordance with an example implementation of the present application. This GUI 1600-B may be displayed after the application administrator 1010 selects the "Confirm" button 1640-A of the application deployment GUI 1600-A of the self-service portal 1600.

The confirmation GUI 1600-B may include a number of fields providing information entered by the application administrator 1010 for confirmation. For example, field 1610-B may provide the application type and field 1620-B may provide the application name. Further, field 1630-B may provide the number of VMs which run the application.

Additionally, field 1640-B may provide a plurality of columns and rows of information about the VMs being provisioned. Column 1641-B may provide the name of the VM. This name may be created from application name 1620-B by the management program 2410. Column 1642-B may provide the number and type of the CPUs required. Column 1643-B may provide the capacity of the memory and column 1644-B may provide the capacity of storage volumes. Each row (164A-B-164D-B) may provide a configuration of each VM. For example, row 164A-B shows the configuration of the VM named "Web-A-1". This VM has 16 high speed CPUs, 8 GB memory and 2 TB of storage volume.

Field 1650-B may provide the calculated unit cost of the application. According to the unit price information 2438 of the VM template table 2430, a unit cost of one "High I/O" VM is 90. Further, the number of "High I/O" VM allocated for this application is 4. Therefore, the unit cost of this application is 360 (90×4). In some example implementations, the unit cost may also include the cost of storage volumes.

The management program 2410 may execute an application deployment process as may be known in the art, if the "Confirm" button 1660-B is selected. Conversely, if the "Cancel" button 1670-B is selected, the management program 2410 may cancel the deployment process. Further, if the "Back" button 1680-B is selected, the management program 2410 redisplays the provisioning GUI 1600-A of the self-service portal 1600 illustrated in FIG. 15.

Figure 16:
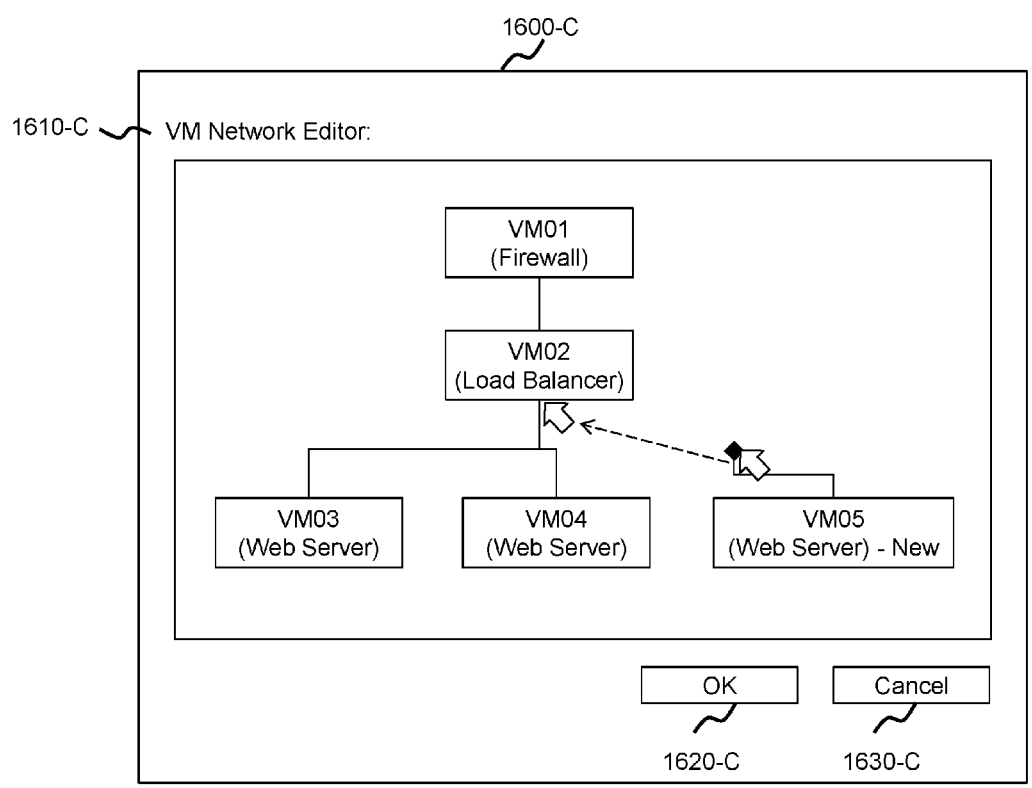
FIG. 16 illustrates an example VM network configuration GUI of the self-service portal, in accordance with an example implementation of the present application.

FIG. 16 illustrates an example VM network configuration GUI 1600-C of the self-service portal 1600, in accordance with an example implementation of the present application. This GUI 1600-C may be used when the application administrator 1010 configures a network among the VMs which he/she is using. The application administrator 1010 may connect one VM to another VM by using the VM network editor 1610-C. For example, VM 05 is being connected to VM 02 by an application administrator 1010 in FIG. 16.

If the "OK" button 1620-C is selected, the management program 2410 may configure networks among VMs according to the topology information specified by application administrator 1010. In this example implementation, the application administrator doesn't specify the concrete network parameters (such as IP addresses). However, in other implementations, the GUI 1600-C may include text fields for specifying network parameters (such as IP addresses).

If the "Cancel" button 1630-C is selected, the management program 2410 may cancel the network configuration process.

Figure 17:
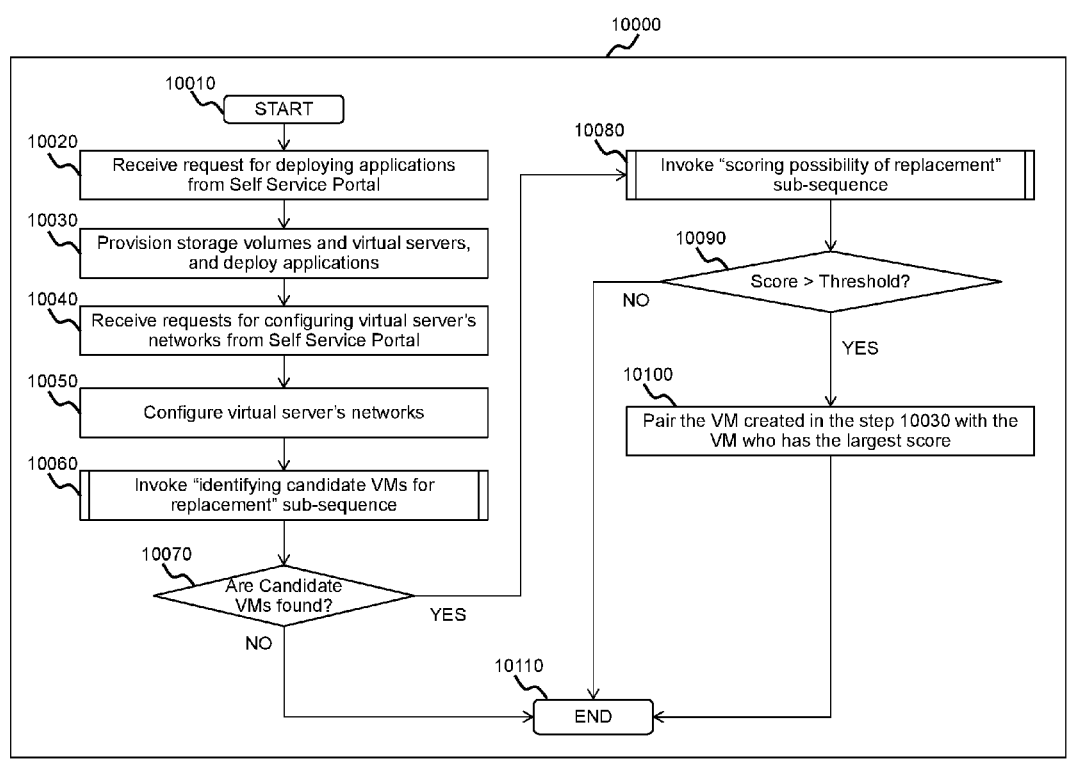
FIG. 17 illustrates a flow diagram for pairing VMs, in accordance with an example implementation of the present application.

FIG. 17 illustrates a flow diagram for a process 10000 for pairing VMs, in accordance with an example implementation of the present application.

At 10010, the process 10000 for pairing VMs begins. At 10020, the management program 2410 receives a request to deploying applications based on input provided by the application administrator 1010 using the self-service portal 1600. The parameters illustrated in the confirmation GUI 1600-B of self-service Portal 1600 are passed to the management program 2410 with the request.

After the request is received, the management program 2410 provisions storage volumes, creates virtual servers, assigns the storage volumes to the virtual servers and deploys the applications on the virtual servers based on the parameters received with the request at 10030.

At 10030, the management program 2410 receives a request to configure the virtual server's networks based on input provided by the application administrator 1010 using the self-service portal 1600. The network topology information entered by the application administrator 1010 using the VM network configuration GUI 1600-C of the self-service portal 1600 is passed to the management program 2410 with the request.

At 10050, the management program 2410 configures virtual server's networks based on the network topology information received with the request. At 10060, the management program 2410 identifies candidate VMs for replacement using the sub-sequence process illustrated in FIG. 18 and discussed below. This sub-sequence process is used to identify one or more VMs that may be replaced by the VMs created in the step 10030.

At 10070, the management program 2410 determines whether any candidate VMs that may be replaced by the newly created VMs were identified in 10060. If at least one candidate VMs were identified in 10060 (i.e. result is "YES"), the process 10000 proceeds to 10080. If no candidate VMs were identified in 10060 (i.e. result is "NO"), then the process 10000 proceeds to 10110.

At 10080, the management program 2410 invokes a sub-sequence of scoring a possibility of replacement illustrated in FIG. 19 and discussed below. Using the sub-sequence of FIG. 19, a score indicating a possibility that the VMs created in 10030 were created to replace one or more VMs in the candidate VMs found in 10060 is calculated.

At 10090, the management program 2410 judges whether the score calculated in 10080 is larger than a predefined threshold or not. The threshold may be specified by an IT infrastructure administrator 1030. If calculated score is greater than the threshold (i.e. the result is "Yes"), then the process 10000 proceeds to 10100. If calculated score is not greater than threshold (i.e. the result is "No"), then the process 10000 proceeds to 10110.

At 10100, the management program 2410 pairs the VM created in 10030 with the candidate VM based on the scores calculated in 10080. In some example implementations, if multiple candidate VMs are identified as possibly being replaced with the VM created in 10030, the VM created in 10030 is paired to the candidate VM having the highest score. The pairing information is stored to the Virtual Server Pair Table 2570. The process then proceeds to 10110.

At 10110, the management program 2410 ends the process 10000 and the process of deploying the applications is completed.

Figure 18:
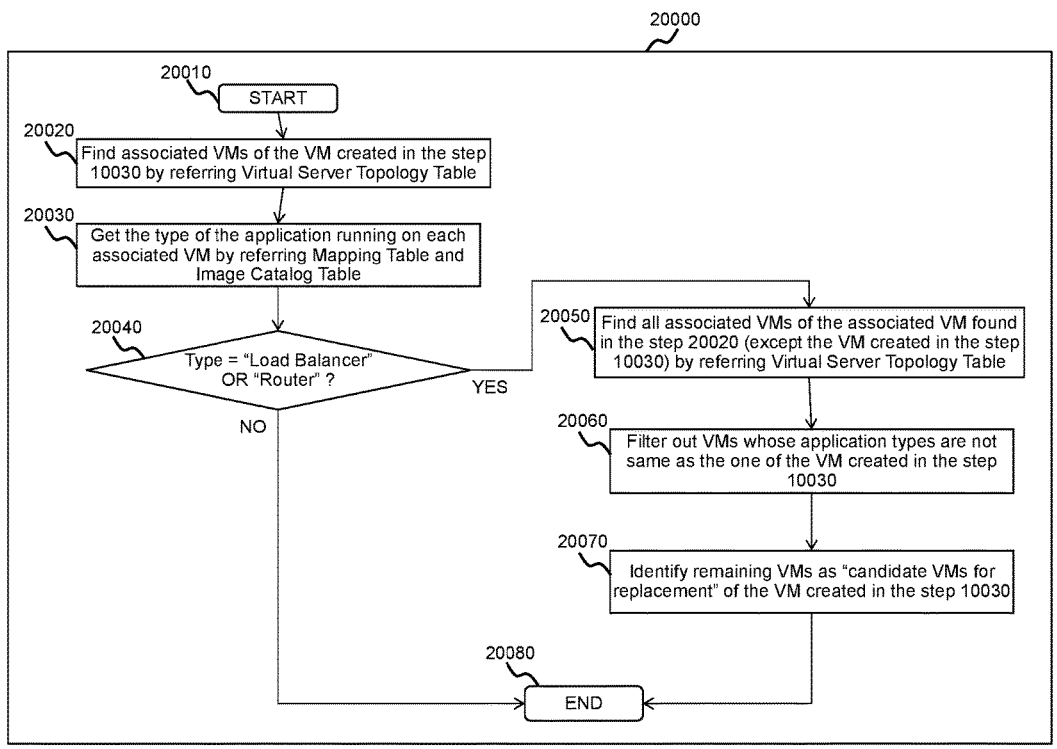
FIG. 18 illustrates a flow diagram for identifying candidate VMs for replacement, in accordance with an example implementation of the present application.

FIG. 18 illustrates a flow diagram of a process 20000 for identifying candidate VMs for replacement, in accordance with an example implementation of the present application. The process 20000 of FIG. 18 may be used by the management program 2410 as a candidate VM identifying sub-sequence in 10060 of FIG. 17.

At 20010, the process 20000 for identifying candidate VMs for replacement begins. At 20020, the management program 2410 finds VMs associated with the VM created in 10030 of the process 10000 of FIG. 17 by referring to the Virtual Server Topology Table 2560. A VM may be considered associated with the VM created in 10030 if the VM shares a parent-child relationship with the VM created in 10030. For example, a VM that is a child VM of the VM created in 10030 may be considered associated with the VM created in 10030. Additionally, a VM that is a parent VM of the VM created in 10030 may be considered associated with the VM created in 10030.

At 20030, the management program 2410 gets the type of the application running on each of the VMs identified as associated with the VM created in 10030 based on the mapping table 2550 and image catalog table 2420.

At 20040, the management program 2410 determines whether the application type of each of the VMs identified as associated with the VM created in 10030 is either a "Load Balancer" or "Router". If any of the VMs identified as associated with the VM created in 10030 is either a "Load Balancer" or "Router" (i.e. the result is "Yes"), then the process 20000 proceeds to 20050. If none of the VMs identified as associated with the VM created in 10030 is either a "Load Balancer" or "Router" (i.e. the result is "No"), then the process 20000 proceeds to 20080. As a replacement VM may likely be used as a load balancer or a router, VMs identified as either a "load balancer" or "router" may be considered as having a probability of being created as a replacement in some implementations. In other implementation, other technologies used for switching input/output (I/O) among VMs may be used as an indication of a probability of being a replacement VM.

In 20050, the management program 2410 finds all associated VMs of each of the VMs identified in 20040 as is either a "Load Balancer" or "Router" (except the VM created in the step 10030) by referring Virtual Server Topology Table 2560. A VM may be considered associated with the VM identified in 20040 if the VM shares a parent-child relationship with the VM identified in 20040. For example, a VM that is a child VM of the VM identified in 20040 may be considered associated with the VM identified in 20040. Additionally, a VM that is a parent VM of the VM identified in 20040 may be considered associated with the VM identified in 20040.

In 20060, the management program 2410 filters out VMs whose application types are not same as the one of the VM created in the step 10030. In 20070, the management program 2410 identifies any VMs not filtered out in 20060 as a "candidate VMs for replacement" by the VM created in 10030. In 20080, the management program 2410 ends the sub-sequence process 20000 and returns to process 10000 at 10070 and proceeds from there.

Figure 19:
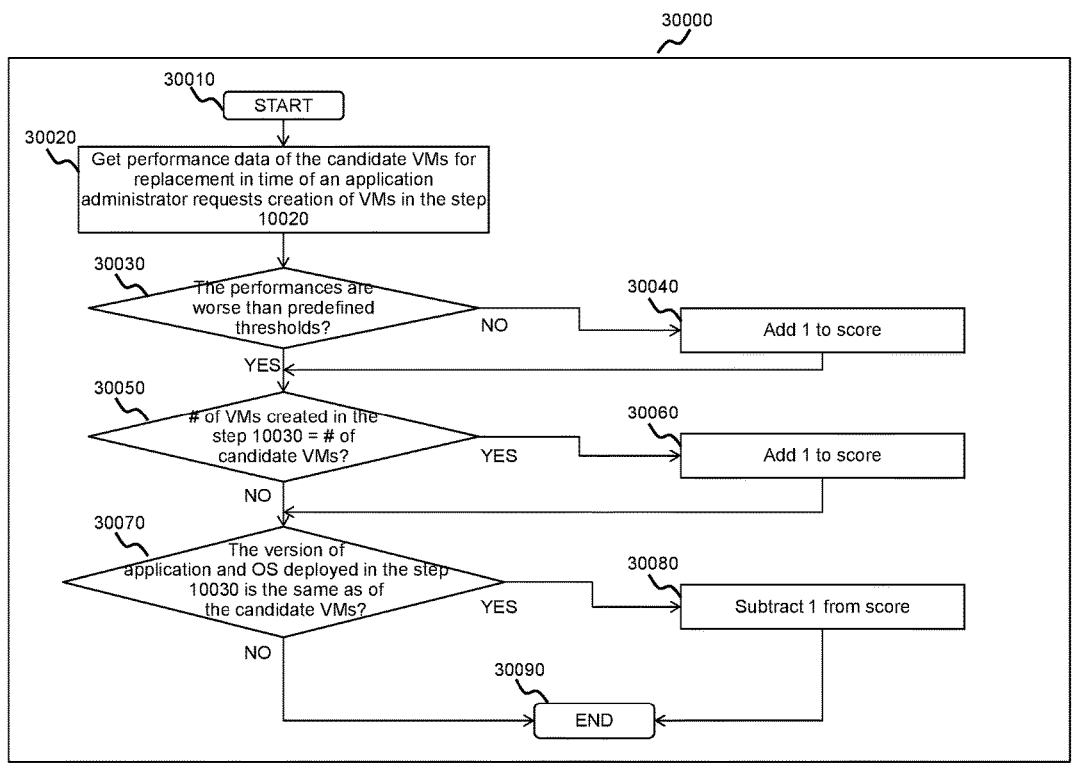
FIG. 19 illustrates a flow diagram for scoring probability of replacement, in accordance with an example implementation of the present application.

FIG. 19 illustrates a flow diagram for a process 30000 for scoring possibility of replacement, in accordance with an example implementation of the present application. The process 30000 of FIG. 19 may be used by the management program 2410 as a scoring sub-sequence in 10080 of FIG. 17.

At 30010, the process 30000 for scoring a possibility of replacement begins.

At 30020, the management program 2410 gets performance data for each of the candidate VMs identified in 10060 of FIG. 17 at the time the application administrator 1010 requested creation of VMs in 10020. At 30030, the management program 2410 determines whether the performance of each of the candidate VMs is worse than a predefined threshold. If the performance of any of the candidate VMs is worse than the threshold (i.e. the result is "Yes"), then the process 30000 proceeds to 30040. If the performance of any of the candidate VMs is not worse than the threshold (i.e. the result is "No"), then the process 30000 proceeds to 30050. Performance worse than the threshold may be considered an indication that the newly created VM was created for load balancing rather than replacement of the candidate VMs.

At 30040, the management program 2410 adds 1 point to (e.g., increments) the score.

At 30050, the management program 2410 determines whether the number of VMs created in 10030 equals the number of candidate VMs identified in 10060 of FIG. 17. If the result is "Yes" then the process 30000 proceeds to 30060. If the result is "No" then the process 30000 proceeds to 30070. The number of VMs created equaling the number of candidate VMs identified may be considered an indicator of replacement.

At 30060, the management program 2410 adds 1 point to (e.g., increments) the score.

At 30070, the management program 2410 determines whether the version of the application and the version of the OS deployed in 10030 is the same as the version of the application and the version of the OS of the candidate VMs. If the result is "Yes" then the process 30000 proceeds to 30080. If the result is "No" then the process 30000 proceeds to 30090. The same version of application and the same version of the OS may be considered an indicator of load balancing rather than replacement.

At 30080, the management program 2410 subtracts 1 point from (e.g., decrements) the score. At 30090, the management program 2410 ends the sub-sequence process 30000 and returns to process 10000 at 10090 and proceeds from there.

Figure 20:
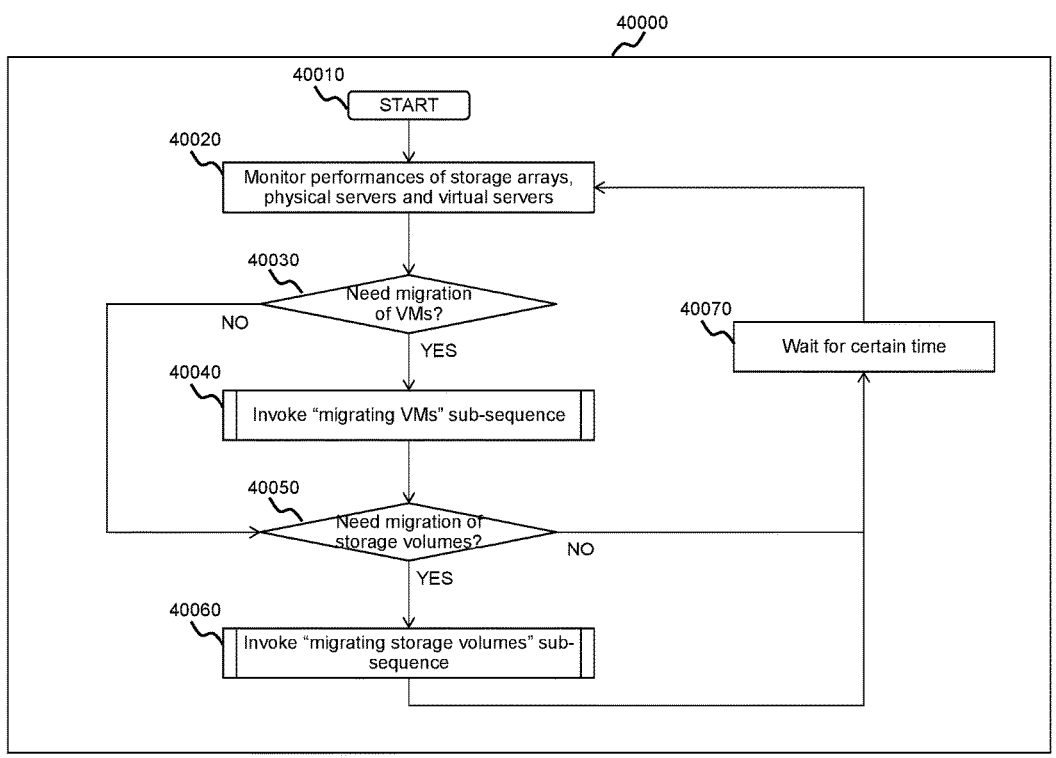
FIG. 20 illustrates a flow diagram for migrating VMs to another physical server and/or storage volumes to another storage array, in accordance with an example implementation of the present application.

FIG. 20 illustrates a flow diagram for a process 40000 for migrating VMs to another physical server and/or storage volumes to another storage array, in accordance with an example implementation of the present application.

At 40010, the process 40000 for migrating VMs to another physical server and/or storage volumes to another storage array begins. At 40020, the management program 2410 monitors performances of the storage arrays, the physical servers and the virtual servers.

At 40030, the management program 2410 determines whether migration of one or more VMs is necessary based on performance of the one or more VMs. If migration of one or more VMs is determined necessary (i.e. the result is "Yes"), then the process 40000 proceeds to the step 40040. If migration of one or more VMs is determined as not necessary (i.e. the result is "No"), then the process 40000 proceeds to the step 40050.

At 40040, the management program 2410 invokes a sub-sequence process 50000 of migrating VMs illustrated in FIG. 21 described in detail below.

At 40050, the management program 2410 determines whether migration of one or more storage volumes is necessary based on the performance of the one or more storage volumes. If migration of one or more storage volumes is determined necessary (i.e., the result is "Yes"), then the process 40000 proceeds to the step 40060. If migration of one or more storage volumes is determined as not necessary (i.e., the result is "No"), then the process 40000 proceeds to the step 40070.

At 40060, the management program 2410 invokes a sub-sequence process 60000 of migrating storage volumes illustrated in FIG. 22 described in detail below.

At 40070, the management program 2410 waits an amount of time before returning to the step 40020 and repeating the process 40000. The amount of time is not particularly limited and may be a second, a minute, an hour, a day, a week, or any other time period that may be apparent to a person of ordinary skill in the art.

Figure 21:
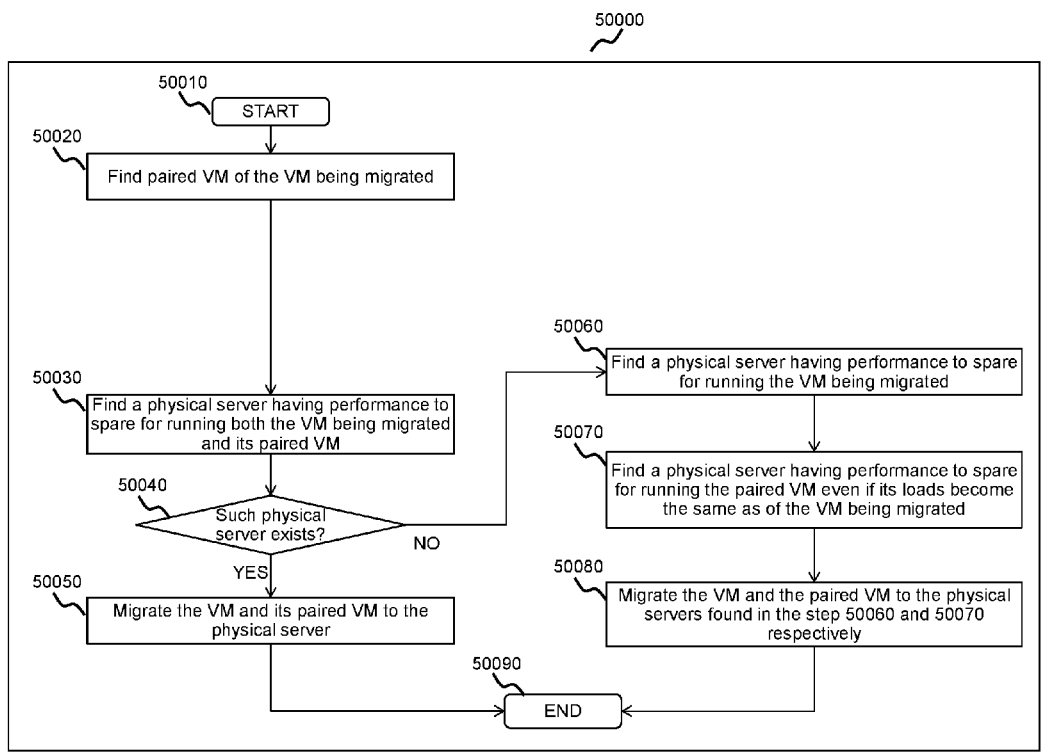
FIG. 21 illustrates a flow diagram for migrating one or more VMs, in accordance with an example implementation of the present application.

FIG. 21 illustrates a flow diagram for a process 50000 for migrating one or more VMs, in accordance with an example implementation of the present application. The process 50000 of FIG. 21 may be used by management program 2410 as sub-sequence for migrating one or more VMs in 40040 of FIG. 20.

At 50010, the process 50000 for migrating one or more VMs begins. At 50020, the management program 2410 finds a paired VM of the VM being migrated based on the pairing information stored in the Virtual Server Pair Table 2570. At 50030, the management program 2410 attempts to identify a physical server, which has performance capacity to spare for running both the VM being migrated and VM paired to the VM being migrated based on the server performance table 2590.

At 50040, the management program 2410 determines a physical server having performance capacity to spare for running both the VM being migrated and the VM paired to the VM being migrated was identified. If a physical server was identified (i.e. the result is "Yes"), then the process 50000 proceeds to 50050. If no physical server was identified (i.e., the result is "No"), then the process 50000 proceeds to 50060.

At 50050, the management program 2410 migrates the VM and the VM paired to the VM being migrated to the physical server identified in 50030.

At 50060, the management program 2410 identifies a physical server, which has performance to spare for running the VM being migrated based on the server performance table 2590.

At 50070, the management program 2410 identifies a physical server, which has performance to spare for running the VM paired to the VM being migrated even if the load of the VM paired to the VM being migrated increased to be the same load as of the VM being migrated based on the server performance table 2590.

At 50080, the management program 2410 migrates the VM and the VM paired to the VM being migrated to the physical servers found in 50060 and 50070, respectively. At 50090, the management program 2410 ends the sub-sequence process 50000 and returns to process 40000 at 40050 and proceeds from there.

Figure 22:
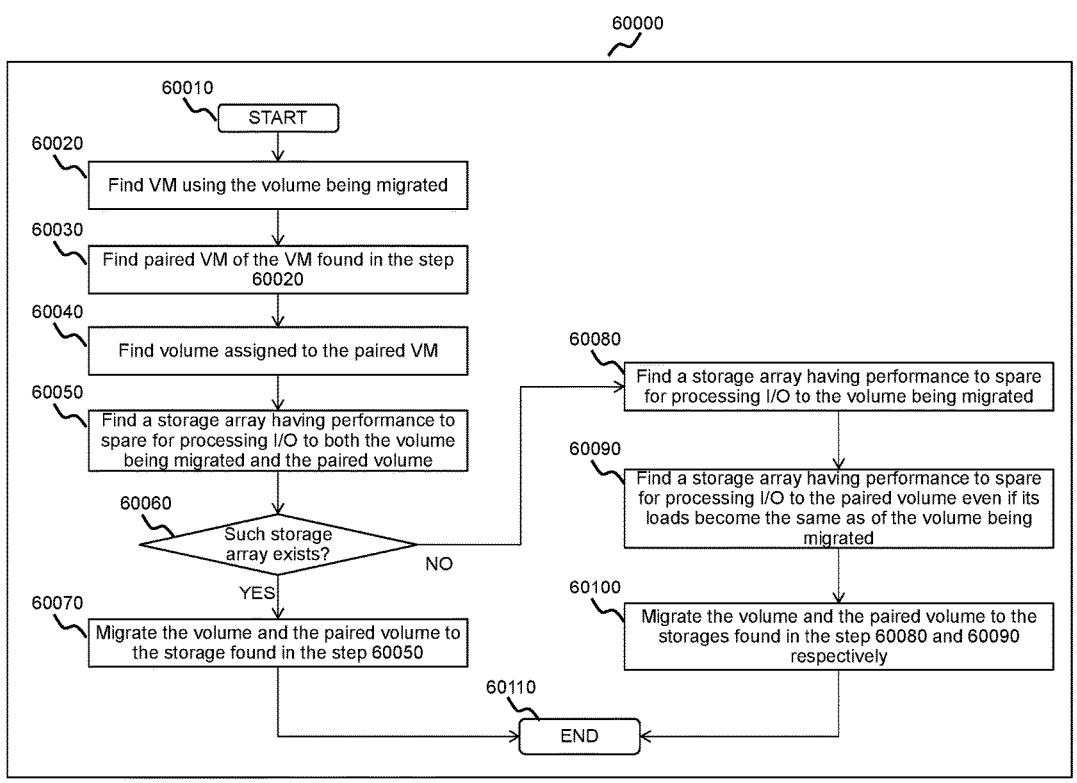
FIG. 22 illustrates a flow diagram for migrating one or more storage volumes, in accordance with an example implementation of the present application.

FIG. 22 illustrates a flow diagram for a process 60000 for migrating one or more storage volumes, in accordance with an example implementation of the present application. The process 60000 of FIG. 22 may be used by management program 2410 as sub-sequence for migrating one or more storage volumes in 40060 of FIG. 20.

At 60010, the process 60000 for migrating one or more storage volumes begins. At 60020, the management program 2410 finds a VM using the volume being migrated. At 60030, the management program 2410 finds a VM paired to the VM found in 60020 based on the pairing information stored in the virtual server pair table 2570. At 60040, the management program 2410 finds a storage volume assigned to the paired VM.

At 60050, the management program 2410 attempts to identify a storage array, which has performance to spare for processing I/O to both the volume being migrated and the paired volume based on the storage performance table 2580.

At 60060, the management program 2410 determines whether a storage array was identified in 60050. If a storage array was identified (i.e. the result is "Yes"), then the process 6000 proceeds to 60070. If no storage array was identified (i.e. the result is "No") then the process proceeds to 60080.

At 60070, the management program 2410 migrates the volume and the paired volume to the storage array found in 60050.

At 60080, the management program 2410 finds a storage array, which has performance capacity to spare for processing I/O to the volume being migrated. At 60090, the management program 2410 finds a storage array, which has performance to spare for processing I/O to the paired volume even the load of the paired volume increased to be the same load as the volume being migrated.

At 60100, the management program 2410 migrates the volume and the paired volume to the storage arrays found in 60080 and 60090 respectively. At 60110, the management program 2410 ends the sub-sequence process 60000 and returns to process 40000 at 40070 and proceeds from there.

In this example implementation, when a management program deploys new VMs, it may identify candidate VMs for replacement, score a possibility of replacement and pairs the new VMs to candidate VMs, if the possibility for replacement is determined to be high. Further in this example implementation, the management program may also migrate VMs and storage volumes used by the VMs to other physical servers and storage arrays in unit. By doing this, an existing VM and a new VM, which may be considered to be a replacement for the existing VM can be migrated together. This may avoid situations where migration of the existing VM for load balancing of physical servers may become an inefficient use of time and labor of infrastructure administrators due to replacement of VMs by application administrators.

Second Example Implementation

The second example implementation may illustrate a management program that may inherit management policies from an existing VMs being replaced and leverage them to manage new VMs, which replace the existing VMs.

Figure 23:
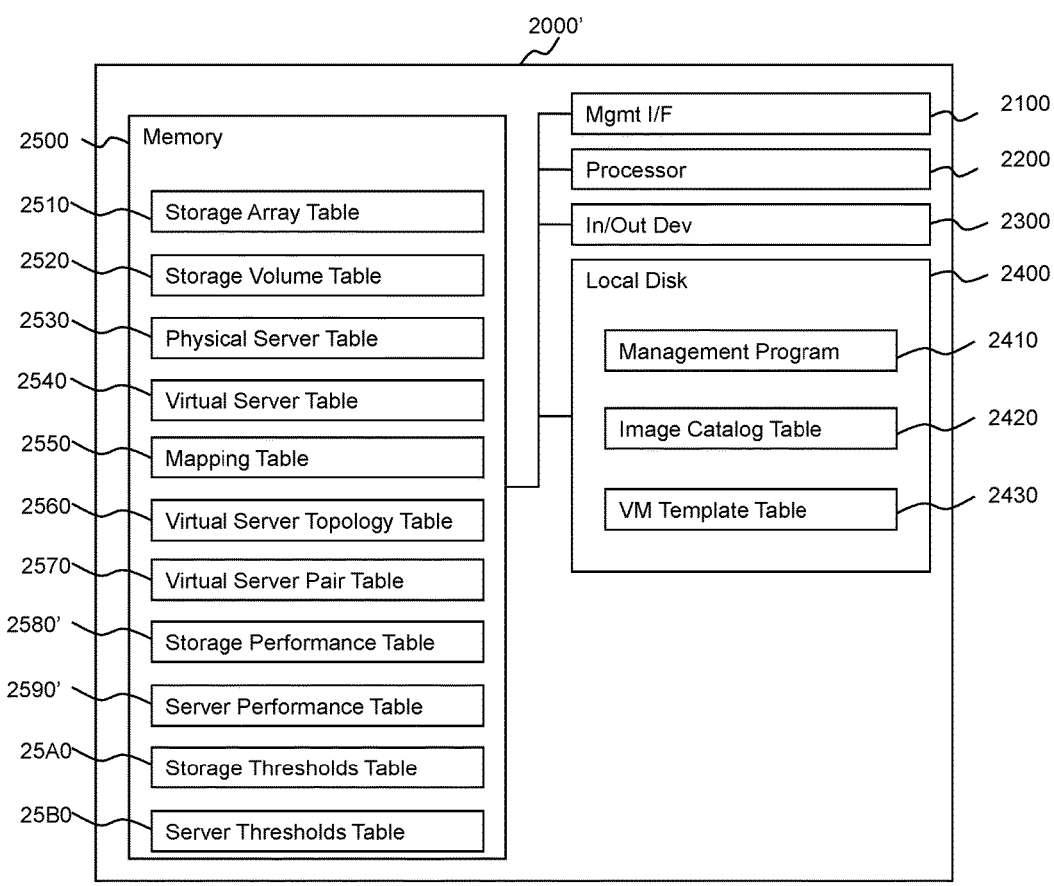
FIG. 23 illustrates a second example implementation of a management server for the cloud system of FIG. 2A.

FIG. 23 illustrates a second example implementation of a management server 2000' for the cloud system of FIG. 2A. Most parts of management server 2000' are similar to the management server 2000 in FIG. 2B. However, in the example of FIG. 23, management server 2000' has storage performance table 2580' and server performance table 2590', which are different from the storage performance table 2580 and server performance table 2590 of the management server 2000 shown in FIG. 2B. Additionally, the management server 2000 includes two additional tables, a storage thresholds table 25A0 and a server thresholds table 25B0.

FIG. 24 illustrates an example storage performance table 2580', in accordance with the second example implementation of the present application. Most parts of the storage performance table 2580' similar to the storage performance table 2580 in FIG. 12. However, the storage performance table 2580' has the original storage ID column 2587' and the original volume ID column 2588'. These columns may be used to show that performance data has been inherited from another storage volume. For example, the row 258A' shows that the performance data of storage volume 02 of storage array 02. This performance data was inherited from storage volume 01 of storage array 01. The method to inherit the performance data is discussed later with respect to FIG. 27.

FIG. 25 illustrates an example server performance table 2590', in accordance with the second example implementation of the present application. Most parts of the server performance table 2590' are similar to the server performance table 2590 in FIG. 13. However, the server performance table 2590' also has the original server ID column 2598', which creates different rows 259A' and 259B' from FIG. 13. This column may be used to show that the performance data is inherited from another server. For example, the row 259B' shows the performance data of virtual server 03. The performance data was inherited from virtual server 02. The method to inherit the performance data is discussed later with respect to FIG. 28.

FIG. 26 illustrates an example storage thresholds table 25A0, in accordance with an example implementation of the present application.

As illustrated, the storage thresholds table 25A0 includes a number of columns providing information on the storage thresholds. Column 25A1 provides the identification information, or identifications, of the storage arrays. Column 25A2 provides the identifications of the storage volumes. Column 25A3 provides the identifications of the storage arrays originally having the thresholds. Column 25A4 provides the identifications of the storage volumes originally having the thresholds. Column 25A5 provides the time periods of thresholds being activated. Column 25A6 provides the thresholds of usage rate of the caches assigned to the storage volumes. Column 25A7 provides the thresholds of usage rate of the array group from which the storage volumes are curved. Column 25A8 provides the thresholds of usage rate of the ports assigned to the storage volumes.

Each row of the storage thresholds table 25A0 shows the thresholds of performance data of each storage volume. For example, row 25AA shows the thresholds of performance data of storage volume 02 of storage array 02. The thresholds are defined for at least three time periods (e.g., from 0:00 AM to 7:00 AM, from 7:00 AM to 0:00 PM and from 0:00 PM to 5:00 PM). The management program 2410 provides alerts to infrastructure administrators 1030 if one or more performance data exceeds the thresholds in the time period. The row 25AA also shows that the thresholds assigned to the storage volume 02 of the storage array 02 were inherited from the storage volume 01 of the storage volume 01. The method to inherit the thresholds is disclosed later.

Figure 27:
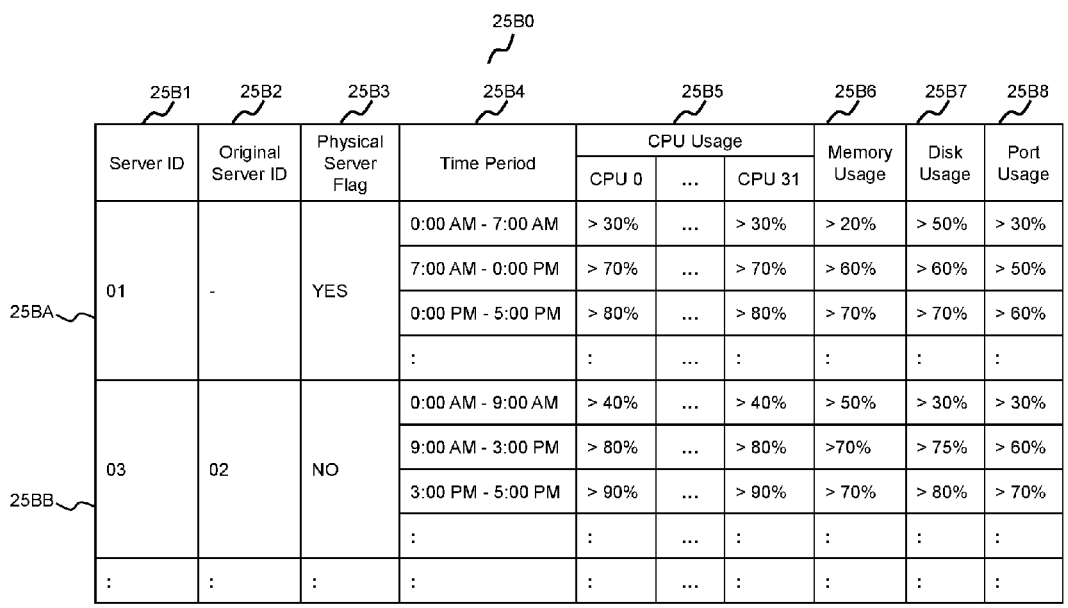
FIG. 27 illustrates an example server thresholds table, in accordance with an example implementation of the present application.

FIG. 27 illustrates an example server thresholds table 25B0, in accordance with an example implementation of the present application.

As illustrated, the server thresholds table 25B0 includes a number of columns providing information on the server thresholds. Column 25B1 provides the identifications of the physical or virtual servers. Column 25B2 provides the identifications of the physical or virtual servers originally having the thresholds. Column 25B3 provides flags indicating whether the servers are a physical server or not. In this example implementation, if the value of "YES" is contained then the server is a physical server and if the value of "NO" is contained then the server is a virtual server. In other example implementations, this relation may be reversed with a value of "YES" indicating a virtual server and a value of "NO" indicating a physical server.

Column 25B4 provides the time periods of thresholds being activated. Column 25B5 provides the thresholds of usage rate of the CPUs of the servers. Column 25B6 provides the thresholds of usage rate of the memories of the servers. Column 25B7 provides the thresholds of usage rate of the disk of the servers. Column 25B8 provides the thresholds of usage rate of the ports of the servers.

Each row (25BA-25BB) of the server thresholds table 25B0 shows the thresholds of performance data of each server. For example, row 25BB shows the thresholds of performance data of virtual server 03. The thresholds are defined for at least three time periods (e.g., from 0:00 AM to 9:00 AM, from 9:00 AM to 3:00 PM and from 3:00 PM to 5:00 PM). The management program 2410 provides alerts to infrastructure administrators 1030 if one or more performance data exceeds the thresholds in the time period. The row 25BB also shows that the thresholds assigned to the virtual server 03 were inherited from the virtual server 02. The method to inherit the thresholds is disclosed later.

Figure 28:
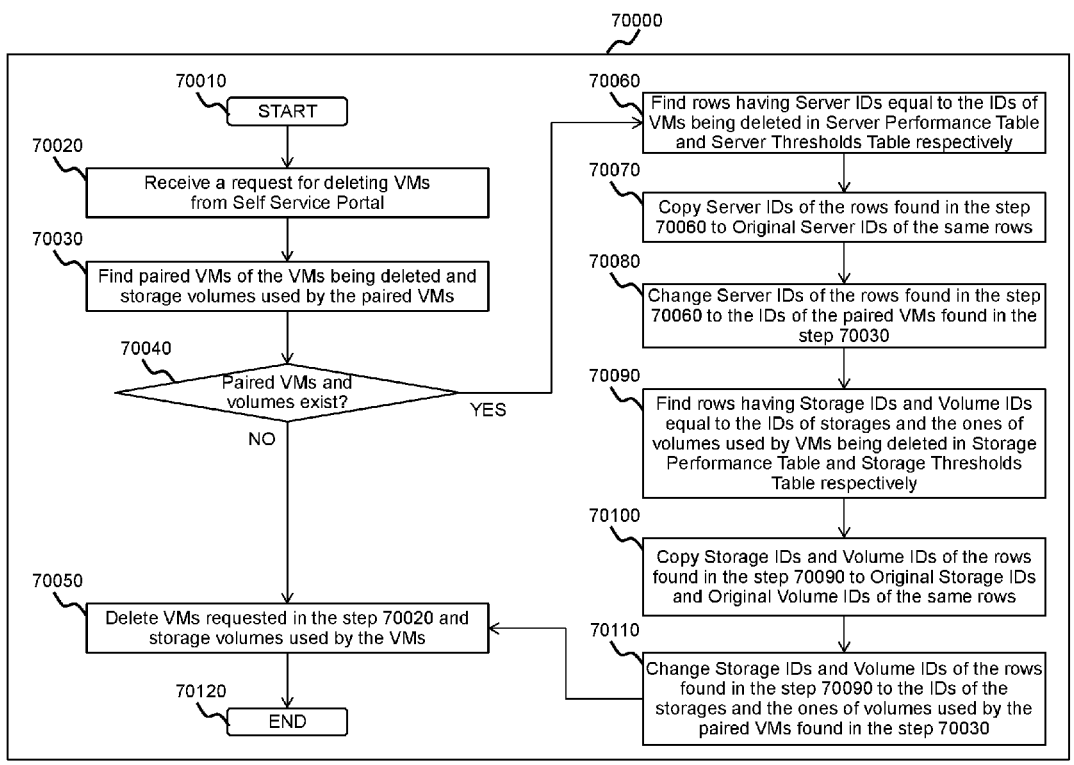
FIG. 28 illustrates a flow diagram for inheriting policies of management, in accordance with the second example implementation of the present application.

FIG. 28 illustrates a flow diagram for a process 70000 for inheriting policies of management from a VM to be deleted, in accordance with the second example implementation of the present application. In this example implementation, the term of "policies of management" may mean one or more sets of performance data and thresholds of performance data assigned to a VM and the storage volumes associated with the VM. However, example implementations of the "policies of management" used are not limited to this example and may include any additional or alternative information that may be apparent to a person of ordinary skill in the art.

At 70010, the process 70000 for inheriting policies of management from a VM to be deleted begins. At 70020, the management program 2410 may receive a request to delete on or more VMs from an application administrator 1010 through the self-service Portal 1600. At 70030, the management program 2410 attempts to identify any VMs paired with the one or more VMs, for which deletion is requested based on the virtual server pair table. The management program 2410 may also identify any storage volumes associated with the paired VMs based on the mapping table 2550.

At 70040, the management program 2410 determines whether any VMs paired with the one or more VMs to be deleted were identified, and whether any storage volumes were identified. If a paired VM was identified, or a storage volume was identified (i.e. the result is "Yes"), then the process 70000 proceeds to 70060. If no paired VM was identified, and no storage volume was identified (i.e., the result is "No"), then the process 70000 proceeds to 70050.

At 70050, the management program 2410 deletes the one or more VMs requested in 70020 and any storage volumes associated with the deleted VMs. The management program 2410 also deletes the configuration data, performance data and threshold data from any tables in the memory 2500.

At 70060, the management program 2410 identifies rows of Server Performance Table 2590 and Server Thresholds Table 258B0 having Server IDs equal to (i.e. matching) the IDs of the one or more VMs, which are to be deleted. At 70070, the management program 2410 copies the Server IDs from the server ID columns 2591', 25B1 of the rows identified in 70060 to the Original Server IDs columns 2598', 25B2 of the rows identified in 70060. At 70080, the management program 2410 changes Server IDs of the server ID columns 2591', 25B1 of the rows found in 70060 to the server IDs of the VMs paired with the one or more VMs, which are to be deleted, identified in 70030.

At 70090, the management program 2410 finds rows whose Storage IDs and Volume IDs equal to the IDs of storage arrays and the IDS of the storage volumes used by the VMs being deleted in the Storage Performance Table 2580' and the Storage Thresholds Table 25A0, respectively. At 70100, the management program 2410 copies the Storage IDs of the rows found in 70090 from the storage ID columns 2581', 25A1 to Original Storage ID columns 2587', 25A3 of the rows found in 70090. At 70100, the management program 2410 also copies the Volume IDs of the rows found in 70090 from the volume ID columns 2582', 25A2 to Original volume ID columns 2588', 25A4 of the rows found in 70090.

At 70110, the management program 2410 changes the Storage IDs in the storage ID columns 2581', 25A1 of the of the rows found in 70090 to the IDs of the storage arrays used by VMs paired with the one or more VMs, which are to be deleted, identified in 70030. At 70110, the management program 2410 also changes the volume IDs in the volume ID columns 2582', 25A2 of the of the rows found 70090 to the IDs of the storage volumes use by VMs paired with the one or more VMs, which are to be deleted, identified in 70030. Once 70110 has been completed, the process precedes to 70050.

At 70120, the management program 2410 ends the management policy inheriting process 70000.

Figure 29:
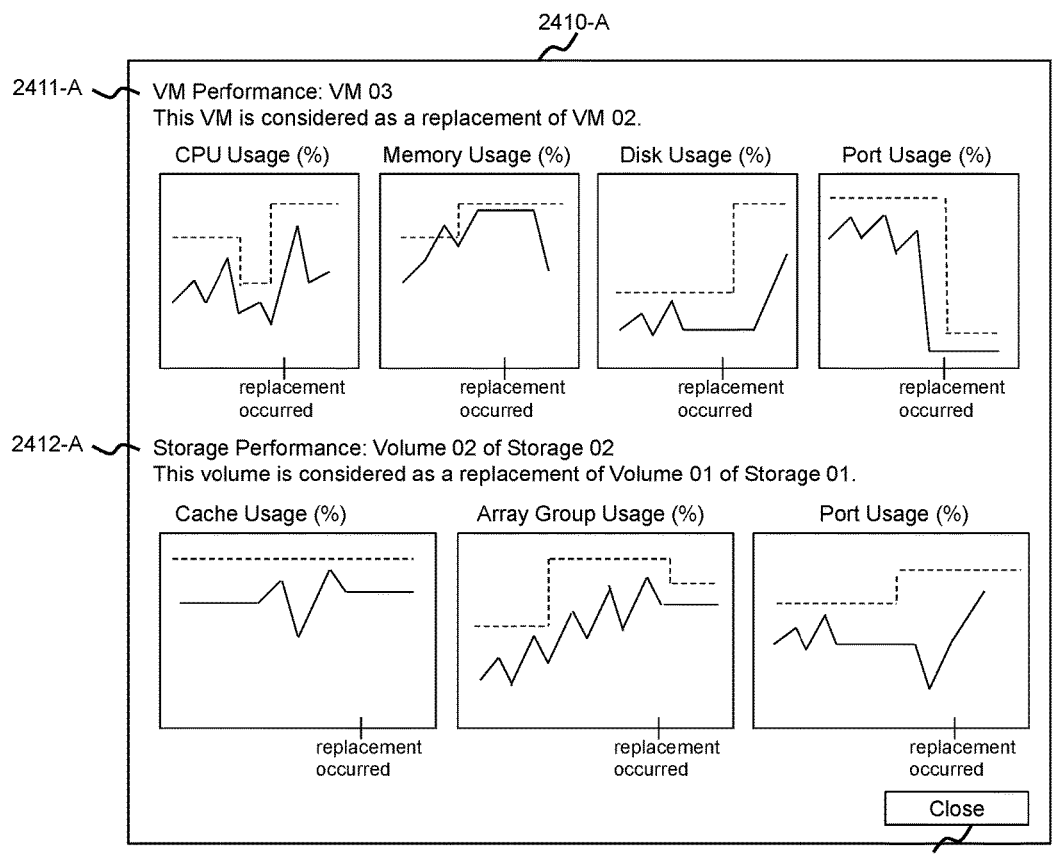
FIG. 29 illustrates an example performance monitoring GUI, in accordance with the second example implementation of the present application.

FIG. 29 illustrates an example performance monitoring GUI 2410-A of the management program 2140, in accordance with the second example implementation of the present application.

Field 2411-A of the GUI 2410-A illustrates performance data and thresholds of a virtual server in a graph. It illustrates CPU usage, memory usage, disk usage and port usage of the virtual server 03. The solid lines represent the performance and the dotted lines represent the thresholds. Field 2411-A also shows that the virtual server 03 is considered as a replacement of the virtual server 02. The timing of replacement (i.e., deletion of the virtual server 02) is also shown in the graph.

Field 2412-A of the GUI 2410-A illustrates performance data and thresholds of a storage volume in a graph. It illustrates cache usage, array group usage and port usage of the storage volume 02 of the storage array 02. The solid lines represent the performance and the dotted lines represent the thresholds. Field 2412-A also shows that the storage volume 02 of the storage array 02 is considered as a replacement of the storage volume 01 of the storage array 01. The timing of replacement (i.e., deletion of the storage volume 01 of storage array 01) is also shown in the graph.

If "Close" button 2413-A is selected, the management program 2410 may close the GUI 2410-A.

In this example implementation, a management program may inherit management policies from existing VMs being replaced and may leverages them to manage new VMs, which replace the existing VMs. In this example implementation, the inheritance of management policies is done at the time of deletion of existing VMs but it is not limited to this. For example, inheritance can be done at the time of configuration changes of routers and/or load balancers to replace VMs. This may allow infrastructure administrators 1030 to manage VMs and storage volumes used by the VMs easily by using the inherited management policies.

In some of the example implementations discussed above, a management program may identify VMs created to replace existing VMs, and pair the VMs so that they can be managed together. Further in some of the example implementations discussed above, a management program may use a process to allow a VM replacing an existing VM to inherit management policies. These example implementations may allow a reduction in operational costs to manage underlying IT infrastructures of cloud environments. However, example implementations need not achieve these or any other benefit, which may be apparent to a person of ordinary skill in the art.

Some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Some example implementations may be represented in form of a computer program containing instructions. The instructions for the program may be stored in a computer readable storage medium, which includes tangible and non-transitory media such as flash memory, random access memory (RAM), Hard Disk Drive (HDD) and the like. Alternatively, instructions may be stored in the form of a computer readable signal medium, which includes other media such as carrier waves.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed:

1. A management computer coupled to a plurality of servers, which manage a plurality of virtual machines including a first virtual machine, the management computer comprising a processor and memory, wherein:

the memory stores:

application type information indicative of an application type of each of the plurality of virtual machines, virtual machine performance data indicative of historical performance information of the plurality of virtual machines;

server performance capacity data indicative of available server performance capacity information of the plurality of servers;

and virtual machine topology information indicative of a topology of the plurality of virtual machines that includes information on associations between the plurality of virtual machines, wherein an association is between two virtual machines that share a parent-child relationship; and the processor identifies one or more candidate virtual machines to replace the first virtual machine from the plurality of virtual machines other than the first virtual machine, wherein each of the one or more candidate virtual machines has an application type that is the same as the first virtual machine, and each is associated with the first virtual machine;

the processor determines a score for each of the one or more candidate virtual machines that is indicative of the probability that the candidate virtual machine was created to replace the first virtual machine, based on at least a comparison of virtual machine performance data of the candidate virtual machine with a performance threshold, wherein a higher score is given to a candidate virtual machine whose virtual machine performance data exceeds the performance threshold;

the processor pairs the first virtual machine with a candidate virtual machine of the one or more candidate virtual machines which has a highest determined score;

wherein the processor, in response to a request to migrate either one of the first virtual machine and the paired candidate virtual machine determines which one of the first virtual machine and the paired virtual machine has larger historical performance requirements based on the historical virtual machine performance data of the first virtual machine and the historical virtual machine performance data of the paired candidate virtual machine, identifies a pair of servers from the plurality of servers, each server of the pair of servers having performance capacity to handle the historical performance requirements of whichever one of the first virtual machine or the paired candidate virtual machine that was determined to have the larger historical performance requirements, the identification being made based on the server performance capacity data of each server of the pair of servers, and causes the first virtual machine and the paired candidate virtual machine to each be migrated to a different server of the pair of servers.

2. The management computer of claim 1, wherein the first virtual machine comprises a number (n) of first virtual machines, which may be replaced;

wherein the paired candidate virtual machine comprises a number (m) of paired candidate virtual machines created in response to a deployment request received by the processor; and wherein the processor is configured to determine the score indicative of the possibility that the number (m) of the paired candidate virtual machines was created for replacing the number (n) of the first virtual machines, based on the number (n) of the first virtual machines and the number (m) of the paired candidate virtual machines.

3. The management computer of claim 1, wherein the memory stores version data indicative of version information of at least one of an application and an operating system deployed on each of the plurality of virtual machines; and wherein the processor determines a score indicative of the possibility of the paired candidate virtual machine was created to replace the first virtual machine, based on version data of the first virtual machine and version data of the paired candidate virtual machine.

4. The management computer of claim 1, wherein the memory stores identification information, which identifies each of the plurality of virtual machines, and threshold data indicative of performance threshold information associated with the identification information of the plurality of virtual machines; and wherein the processor determines identification information of the first virtual machine based on a request to delete the first virtual machine; determines identification information of the paired candidate virtual machine in response to receiving a request to delete the first virtual machine; identifies threshold data associated with the determined identification information of the first virtual machine;

associates the identified threshold data with the determined identification information of the paired candidate virtual machine;

deletes the first virtual machine based on the received request to delete the first virtual machine.

5. A method comprising:

determining, by a computing device, application type information indicative of an application type of each of a plurality of virtual machines; determining, by the computing device, virtual machine topology information indicative of a topology of the plurality of virtual machines that includes information on associations between the plurality of virtual machines, wherein an association is between two virtual machines that share a parent-child relationship; and identifying one or more candidate virtual machines to replace a first virtual machine from the plurality of virtual machines other than the first virtual machine, wherein each of the one or more candidate virtual machines has an application type that is the same as the first virtual machine;

determining a score for each of the one or more candidate virtual machines that is indicative of the probability that the candidate virtual machine was created to replace the first virtual machine, based on at least a comparison of virtual machine performance data of the candidate virtual machine with a performance threshold, wherein a higher score is given to a candidate virtual machine whose virtual machine performance data exceeds the performance threshold;

paring the first virtual machine with a candidate virtual machine of the one or more candidate virtual machines, which has a highest determined score in response to a request to migrate either one of the first virtual machine and the paired candidate virtual machine:

determining, by the computing device, which one of the first virtual machine and the paired candidate virtual machine has larger historical performance requirements based on the historical virtual machine performance data of the first virtual machine and the historical virtual machine performance data of the paired candidate virtual machine, identifying, by the computing device, a pair of servers from the plurality of servers, each server of the pair of servers having performance capacity to handle the historical performance requirements of whichever one of the first virtual machine or the paired candidate virtual machine that was determined to have the larger historical performance requirements, the identification being made based on the server performance capacity data of each server of the pair of servers, and causing the first virtual machine and the paired candidate virtual machine to each be migrated to a different server of the pair of servers.

6. The method of claim 5, wherein the first virtual machine comprises a number (n) of first virtual machines, which may be replaced;
wherein the paired candidate virtual machine comprises a number (m) of paired candidate virtual machines created in response to a deployment request received by the processor; and
further comprising determining, by the computing device, the score indicative of the possibility that the number (m) of the paired candidate virtual machines was created for replacing the number (n) of the first virtual machines, based on the number (n) of the first virtual machines and the number (m) of the paired candidate virtual machines.

7. The method of claim 5, further comprising determining, by the computing device, the score indicative of the possibility that the paired candidate virtual machine is created to replace the first virtual machine, based on version data of the first virtual machine and version data of the paired candidate virtual machine.

8. A non-transitory computer readable medium, storing instructions for executing a process, the instructions comprising:
determining application type information indicative of an application type of each of a plurality of virtual machines;
determining virtual machine topology information indicative of a topology of the plurality of virtual machines that includes information on associations between the plurality of virtual machines, wherein an association is between two virtual machines that share a parent-child relationship; and
identifying one or more candidate virtual machines to replace a first virtual machine from the plurality of virtual machines other than the first virtual machine, wherein each of the one or more candidate virtual machines has an application type that is the same as the first virtual machine;
determining a score for each of the one or more candidate virtual machines that is indicative of the probability that the candidate virtual machine was created to replace the first virtual machine, based on at least a comparison of virtual machine performance data of the candidate virtual machine with a performance threshold, wherein a higher score is given to a candidate virtual machine whose virtual machine performance data exceeds the performance threshold;
paring the first virtual machine with a candidate virtual machine of the one or more candidate virtual machines, which has a highest determined score
in response to a request to migrate either one of the first virtual machine and the paired candidate virtual machine:
determining which one of the first virtual machine and the paired candidate virtual machine has larger historical performance requirements based on the historical virtual machine performance data of the first virtual machine and the historical virtual machine performance data of the paired candidate virtual machine,
identifying a pair of servers from the plurality of servers, each server of the pair of servers having performance capacity to handle the historical performance requirements of whichever one of the first virtual machine or the paired candidate virtual machine that was determined to have the larger historical performance requirements, the identification being made based on the server performance capacity data of each server of the pair of servers, and
causing the first virtual machine and the paired candidate virtual machine to each be migrated to a different server of the pair of servers.

* * * * *